US012239918B2

(12) United States Patent
Jones et al.

(10) Patent No.: US 12,239,918 B2
(45) Date of Patent: Mar. 4, 2025

(54) ACCESSIBLE SWING

(71) Applicant: Landscape Structures Inc., Delano, MN (US)

(72) Inventors: Bryant A. Jones, Medicine Lake, MN (US); Darryl T. Wrolson, Minnetrista, MN (US); Matthew A. Tschann, Watertown, MN (US); Thomas L. Keller, Delano, MN (US); Kent D. Wuchterl, Forest Lake, MN (US)

(73) Assignee: Landscape Structures Inc., Delano, MN (US)

( * ) Notice: Subject to any disclaimer, the term of this patent is extended or adjusted under 35 U.S.C. 154(b) by 0 days.

(21) Appl. No.: 18/443,592

(22) Filed: Feb. 16, 2024

(65) Prior Publication Data

US 2024/0252934 A1 Aug. 1, 2024

Related U.S. Application Data

(63) Continuation of application No. 17/445,490, filed on Aug. 19, 2021, now Pat. No. 11,938,411.

(60) Provisional application No. 63/135,727, filed on Jan. 10, 2021, provisional application No. 63/074,410, filed on Sep. 3, 2020.

(51) Int. Cl.

| | |
|---|---|
| ***A63G 9/02*** | (2006.01) |
| ***A61G 5/10*** | (2006.01) |
| ***A63G 9/16*** | (2006.01) |
| ***A63G 9/22*** | (2006.01) |

(52) U.S. Cl.
CPC .............. *A63G 9/02* (2013.01); *A61G 5/104* (2013.01); *A63G 9/16* (2013.01); *A63G 9/22* (2013.01)

(58) Field of Classification Search
CPC . A63G 9/00; A63G 9/16; A63G 31/00; A61G 5/104
USPC .................................................. 472/118–125
See application file for complete search history.

(56) References Cited

U.S. PATENT DOCUMENTS

| | | | | |
|---|---|---|---|---|
| 5,413,367 | A * | 5/1995 | Ochiai | A61G 5/066 180/8.5 |
| 5,938,283 | A | 8/1999 | Babcock et al. | |
| 6,736,732 | B1 * | 5/2004 | Devine | A61G 5/104 472/125 |
| 6,875,118 | B1 | 4/2005 | Checketts | |
| 10,406,047 | B1 * | 9/2019 | Runnels | A61G 5/104 |
| 10,555,616 | B1 * | 2/2020 | Barcell | A63G 9/16 |
| 2004/0066072 | A1 * | 4/2004 | Trippensee | A61G 5/104 297/330 |

(Continued)

FOREIGN PATENT DOCUMENTS

| | | |
|---|---|---|
| JP | S3825938 U | 11/1963 |
| JP | H05103875 A | 4/1993 |

OTHER PUBLICATIONS

First Office Action for Japanese Patent Application No. 2023-615134, Dated Mar. 5, 2024, 7 pages including English Translation.

(Continued)

*Primary Examiner* — Kien T Nguyen
(74) *Attorney, Agent, or Firm* — Jonas R. Mellang; Kelly, Holt & Christenson, PLLC

(57) ABSTRACT

A swinging playground device includes a swing platform. The swinging playground device also includes a skirt coupled to the swinging platform and fills an area below the swinging platform as the swinging platform moves in a swinging motion.

20 Claims, 32 Drawing Sheets

(56) References Cited

U.S. PATENT DOCUMENTS

| | | | | |
|---|---|---|---|---|
| 2019/0290519 | A1* | 9/2019 | Sjogren | A61G 5/104 |
| 2020/0306113 | A1* | 10/2020 | MayField | A61G 5/1048 |

OTHER PUBLICATIONS

Ofice Action for Canadian Patent Application No. 3191500, dated Jun. 13, 2024, 3 pages.

* cited by examiner

ACCESSIBLE SWING

CROSS-REFERENCE TO RELATED APPLICATIONS

The present application is a continuation of and claims priority of U.S. patent application Ser. No. 17/445,490, filed Aug. 19, 2021, the content of which is hereby incorporated by reference in its entirety, which application then claims the priority of provisional application Ser. No. 63/135,727, filed on Jan. 10, 2021 and provisional application Ser. No. 63/074,410, filed on Sep. 3, 2020, the contents of which are hereby incorporated by reference in its entirety.

BACKGROUND

Playground environments present unique design challenges. Playgrounds are designed to be low maintenance, sometimes with years between part replacement. Playgrounds also are designed to withstand high temperature differentials—snow and ice in the winter as well as extreme heat and precipitation in the summer. Playgrounds are also often designed for use by children with little or no supervision. Children learn important mobility and interpersonal skills on the playground. For that reason, it is important that interactive structures within playground environments be accessible by children with a wide variety of abilities. However, above all, it is imperative that playground structures and devices are safe for their users.

SUMMARY

A swinging playground device includes a swing platform. The swinging playground device also includes a skirt coupled to the swinging platform and fills an area below the swinging platform as the swinging platform moves in a swinging motion.

DETAILED DESCRIPTION OF ILLUSTRATIVE EMBODIMENTS

As playground structures become more inclusive, one feature that has been desired is a swinging device that can safely accommodate wheelchair-bound users, as well as non-wheelchair bound users. The swinging device must be safe for wheelchair-bound users of a variety of abilities, and can be designed such that a wheelchair-bound user can interact with the swinging mechanism that causes the device to swing. The swinging device can also be constructed and installed such that the wheelchair-bound user can use the swinging device without assistance from others.

For safety reasons, the swinging device can be controllable such that substantially any user can cause some swinging motion, but that a maximum acceleration/deceleration is achieved that can prevent injury, or prevent a user from being thrown from the device. Additionally, wheelchair accommodation areas can have defined parking, such that the user knows when they are in a safe riding position.

As discussed in greater detail below, at least some of the examples presented herein address these needs. For instance, some examples allow a wheelchair-bound user to move directly onto, and off of, the swinging device, without any external transfer system. In some embodiments, a ramp leads up to the swinging device.

Figure 1:
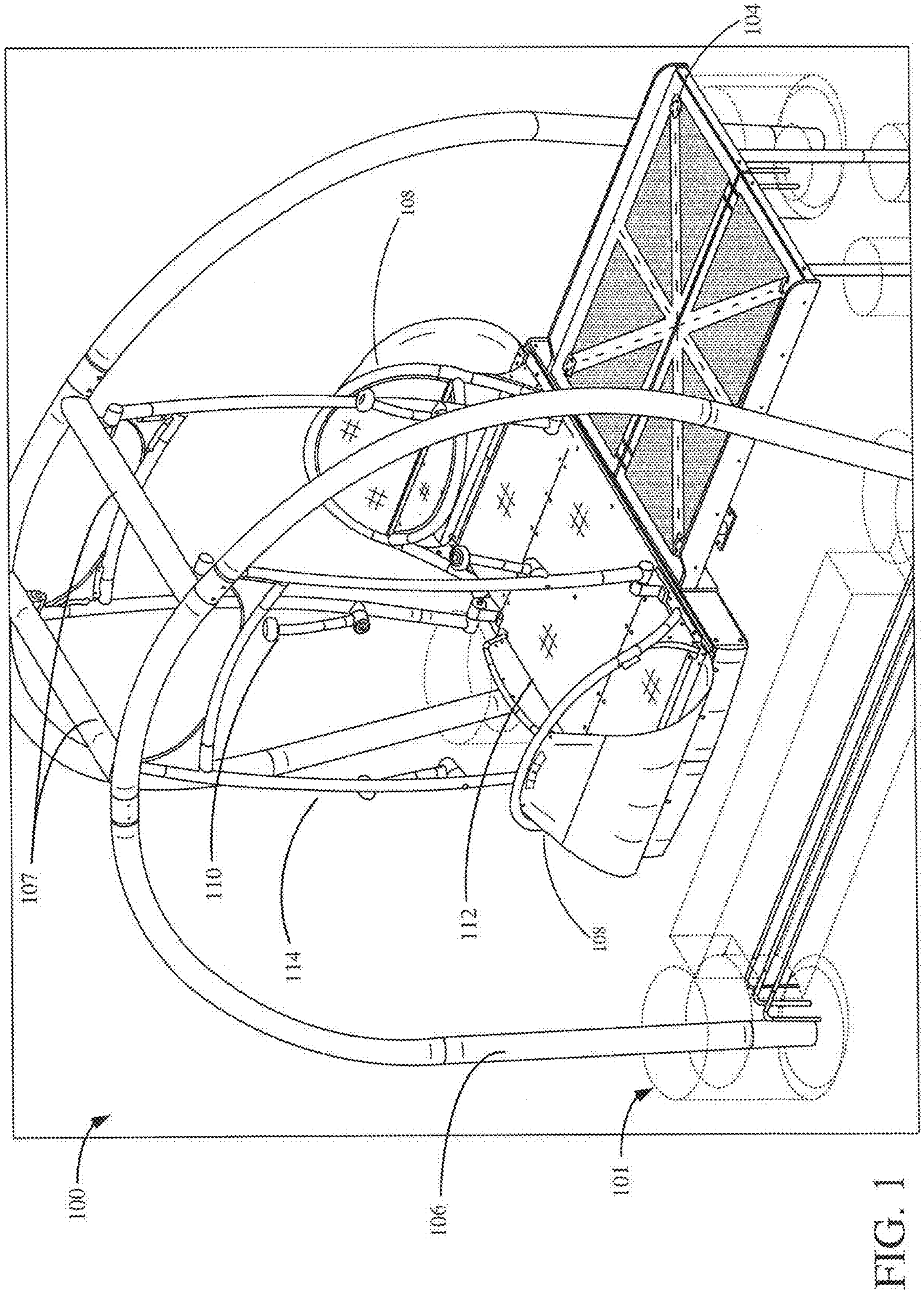
FIG. 1 is a perspective view showing an example play environment.

FIG. 1 is a perspective view showing an example playground swing 100. As shown the play swing 100 includes a ramp 104, a frame 106, a platform 112, swing arms 114, and user areas 108. In other examples, swing 100 can include additional, different or fewer components.

Frame 106 is coupled to the ground through footings 101, however, in other examples, frame 106 can be coupled to the ground in other ways as well. For example, frame 106 can be secured via fasteners. Frame 106 as shown includes two arch-like structures coupled together by two support members 107. In other examples, frame 106 can be shaped in different ways as well. In other examples, there can be a different number of support members 107.

Frame 106 is coupled to four swing arms 114 that support the weight of swing platform 112. As shown, there are four swing arms 114, in other examples there can be a different amount of swing arms 114. For instance, there can be two swing arms 114 that couple to each side of platform 112. In this example, platform 112 would tilt as it swings. An advantage to having four swing arms 114 coupled and configured as shown, is that platform 112 does not tilt as it swings and instead stays substantially parallel to the ground. Keeping platform 112 level helps prevent a wheeled vehicle on platform 112 from rolling with a potential tilt.

Ramp 104 allows easy access onto platform 112, especially wheeled devices. In some examples, ramp 104 is not needed as platform 112 is level with the surrounding ground. Two different types of user areas 108 are shown. The first user area 108 has a seat for a user to freely sit on. The second user area 108 has an open area where a wheelchair can park and a back such that the wheelchair cannot roll off of platform 112 rearwardly. In some examples, a different combination of these user areas 108 is possible. As will be described below, users of all abilities can use the swing system without assistance.

Figure 2:
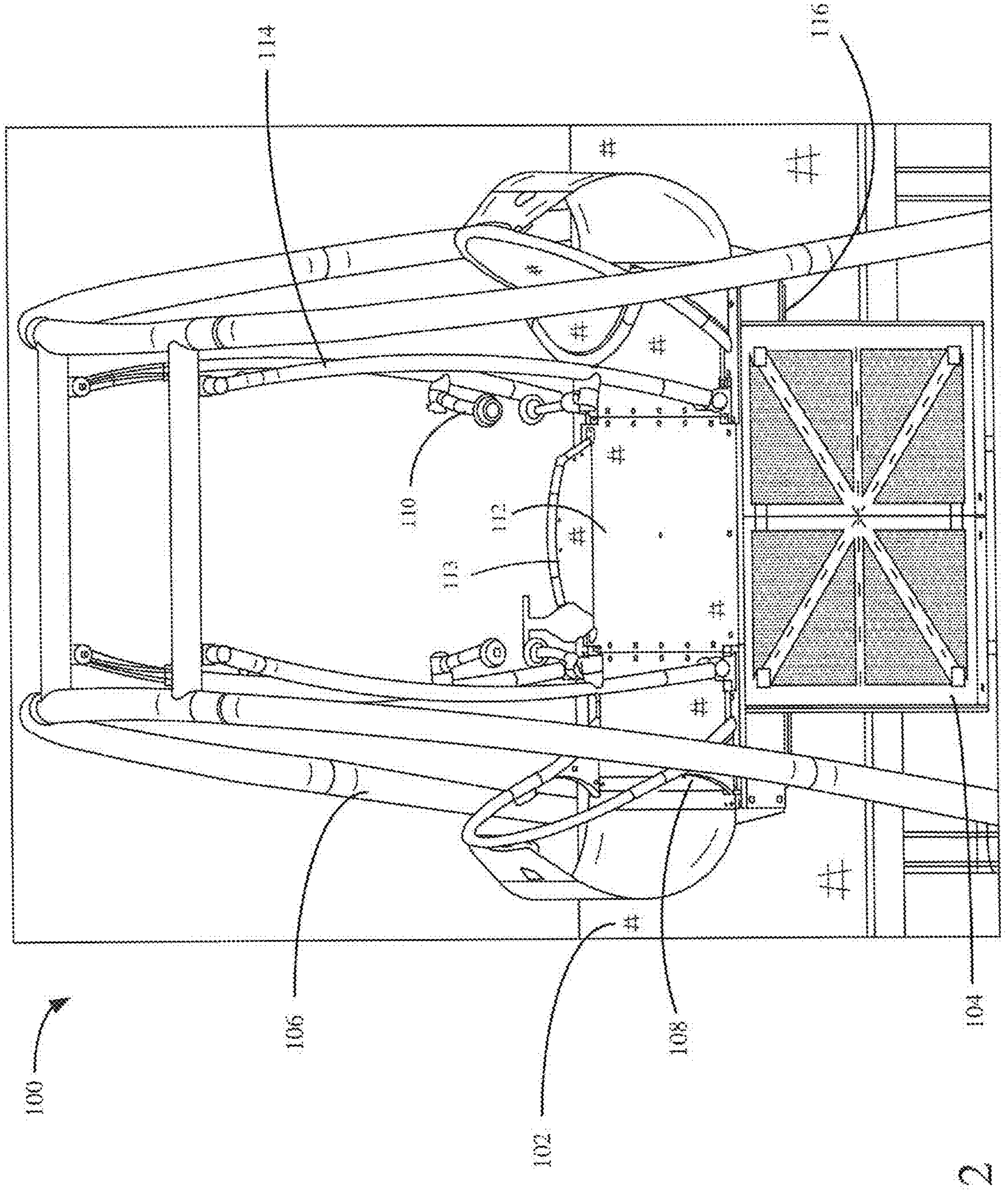
FIG. 2 is a front perspective view showing an example swing in a neutral position.

FIG. 2 is a front perspective view showing an example swing in a neutral position. In the neutral position, a user can transfer from ramp 104 to platform 112 relatively easy. As shown, a stop 113 is provided to prevent users from falling off the opposing side of the swing. In other examples, another ramp 104 can be placed on the opposing side of the swing, such that stop 113 is not needed. For example, see FIG. 23. In some examples, stop 113 is removable or retractable. For example, another stop 113 could be proximate ramp 104, when a user ascends ramp 104 they can lower stop 113 such that they can get on platform 112.

Figure 3:
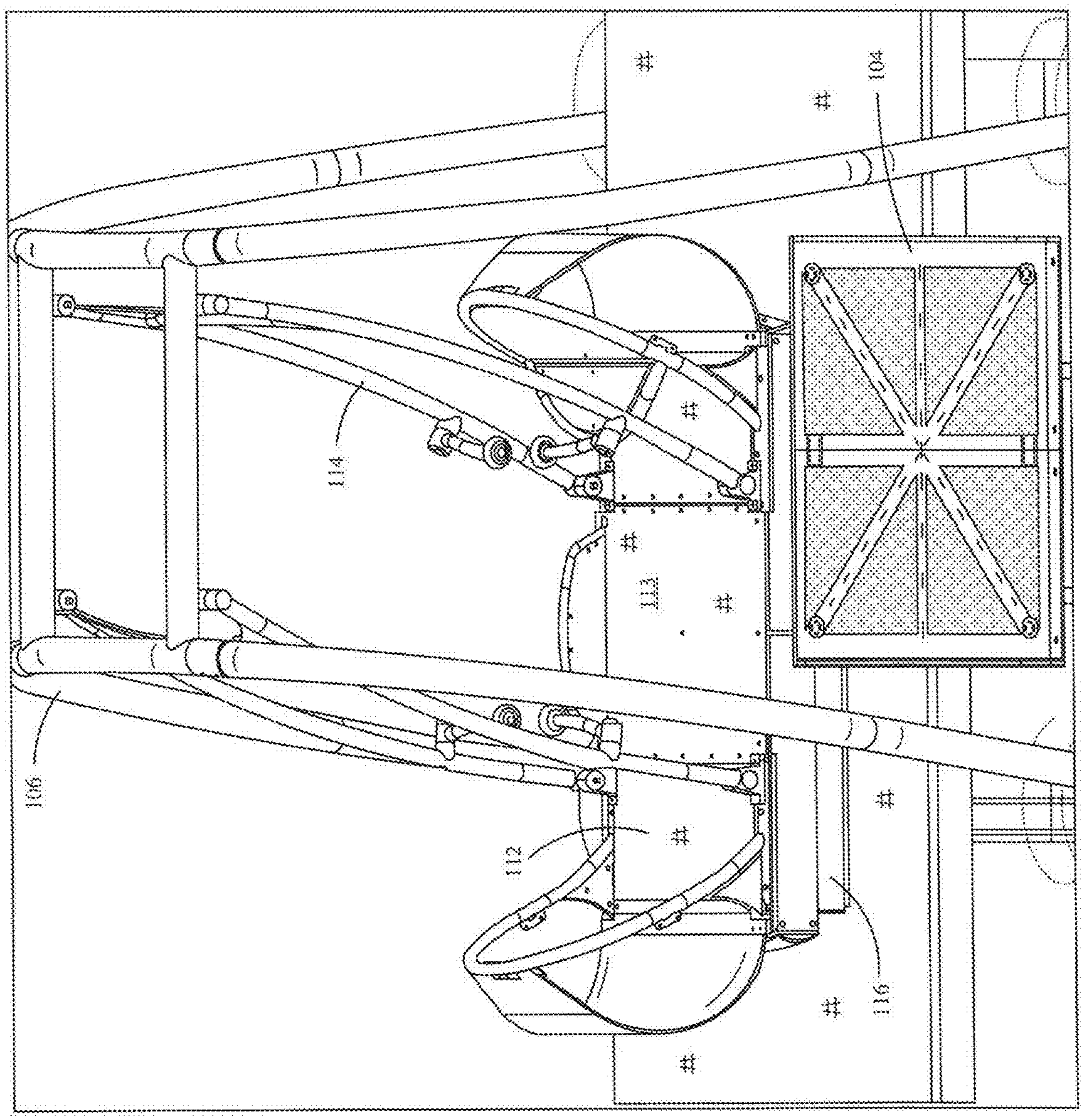
FIG. 3 is a front perspective view showing an example swing in a full swing position.

FIG. 3 is a front perspective view showing an example swing 100 in a full swing position. The full swing position here includes platform 112 being raised three inches and laterally displaced twenty-five inches from the neutral position. In other examples, the height and/or lateral displacement may be greater or lesser. As can be seen in this view, skirt 116 has been provided to fill in the space displaced by the lifting of platform 112. This prevents a user or other object from being caught underneath platform 112. It can also "sweep" or otherwise clear the area underneath platform 112.

Figure 4:
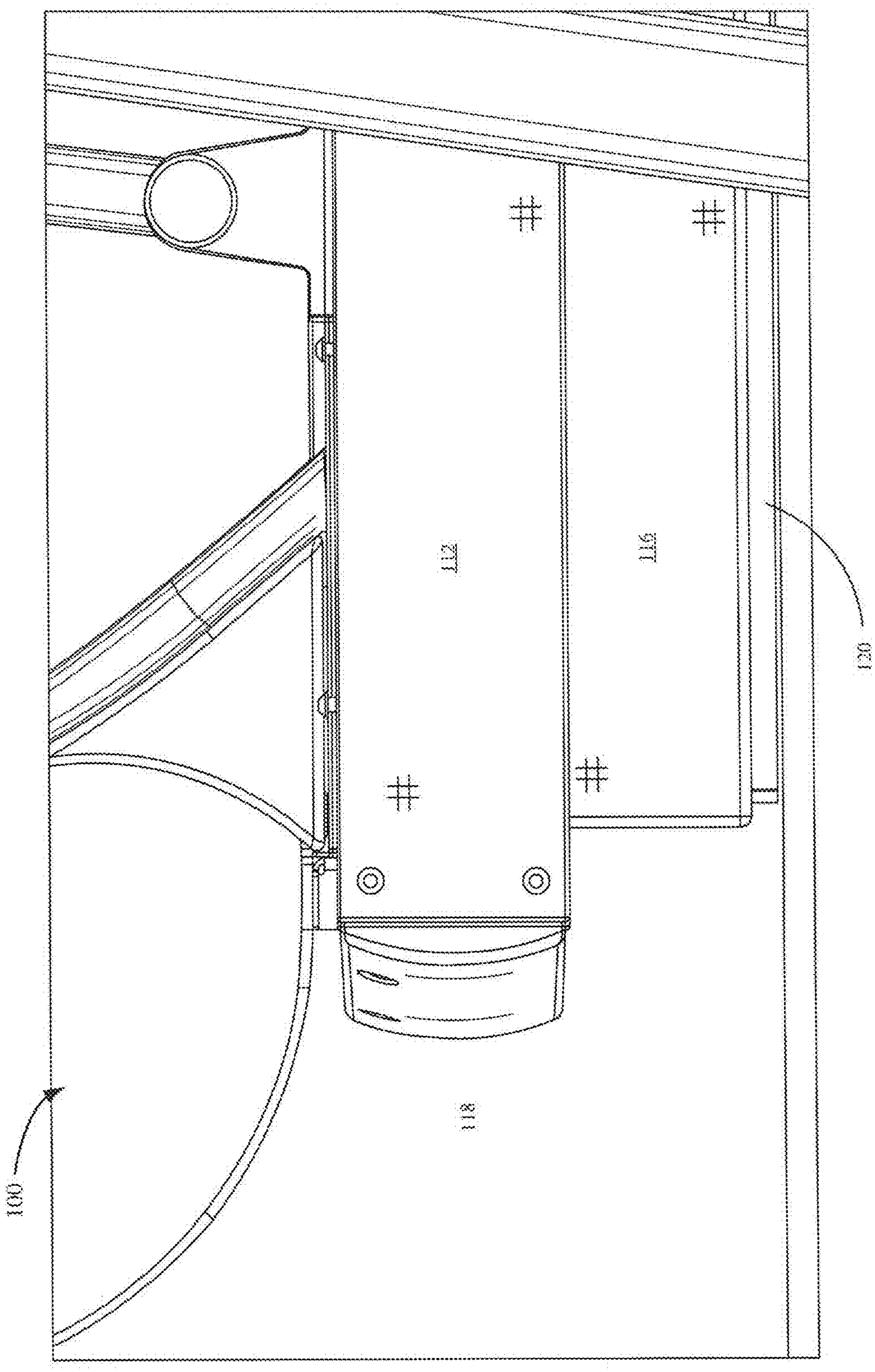
FIG. 4 is a component view showing an example swing in a full swing position.

FIG. 4 is a component view showing an example swing 100 in a full swing position. As shown, bumper 118 is on platform 112. Bumper 118 reduces the impact felt on an object that might get in the way of swinging platform 112. In some examples, additional bumpers 118 may also be provided on skirt 116. As shown, skirt 116 includes a sweep 120. Sweep 120, as shown, provides a flexible component to better contour to the ground. As shown, sweep 120 includes a belting material. In other examples, sweep 120 includes other materials as well, such as, but not limited to, a brush, foam material, an inflatable material, a spring-loaded object, etc.

Figure 5:
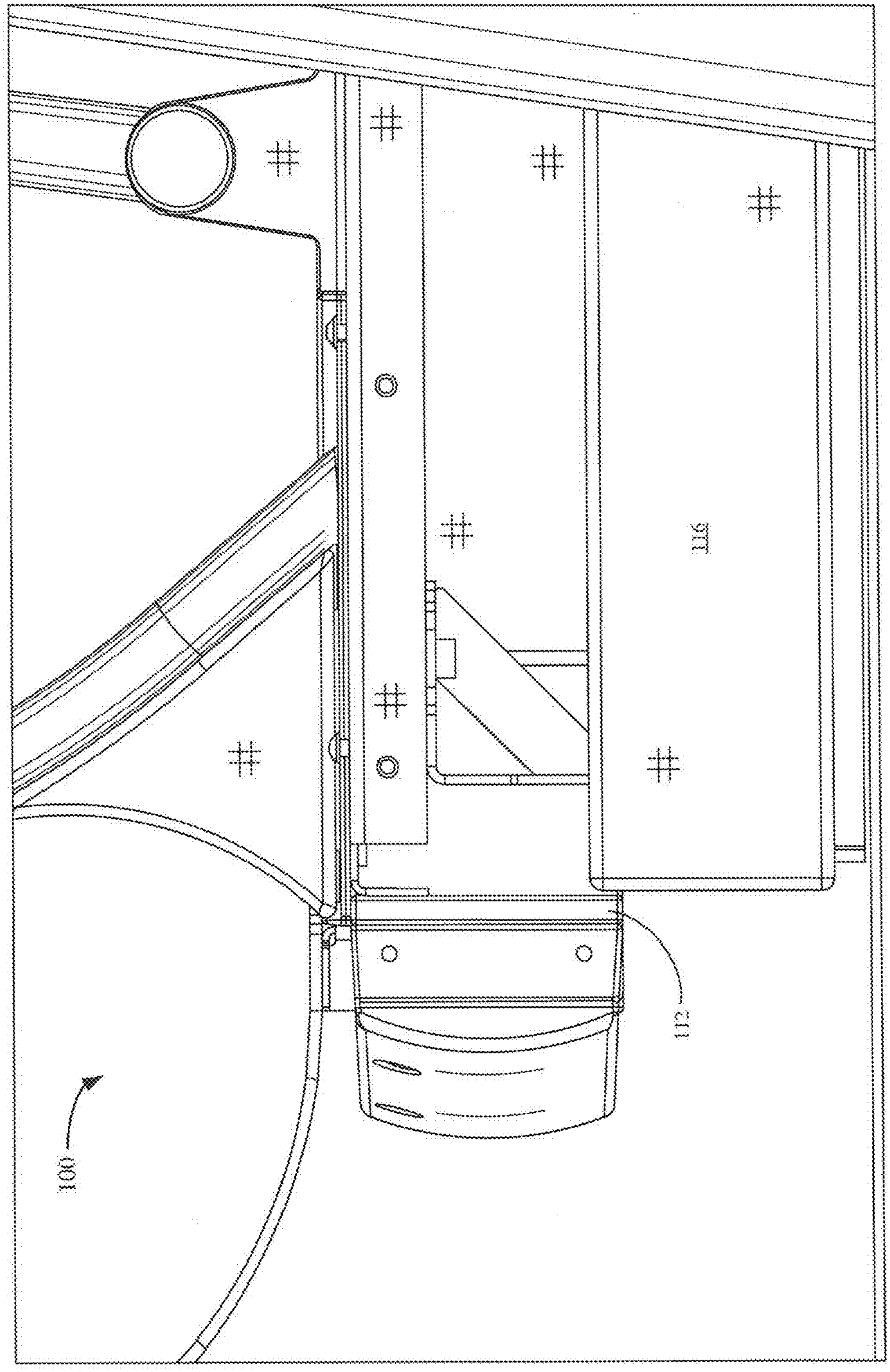
FIG. 5 is a component view showing an example swing in a full swing position with a panel removed.

FIG. 5 is a component view showing an example swing 100 in a full swing position with a component removed. In this figure, one or more components from platform 112 have been removed to show the coupling of skirt 116 and platform 112. In the full swing position, it can be shown that there is still some overlap between platform 112 and skirt 116. This overlap prevents skirt 116 from "slipping out" from underneath platform 112 or from platform 112 from "floating over" the skirt 116. Of course, other means can be provided as well to prevent the uncoupling of platform 112 and skirt 116. For instance, a coupling mechanism such as a fastener, can be provided.

Figure 6:
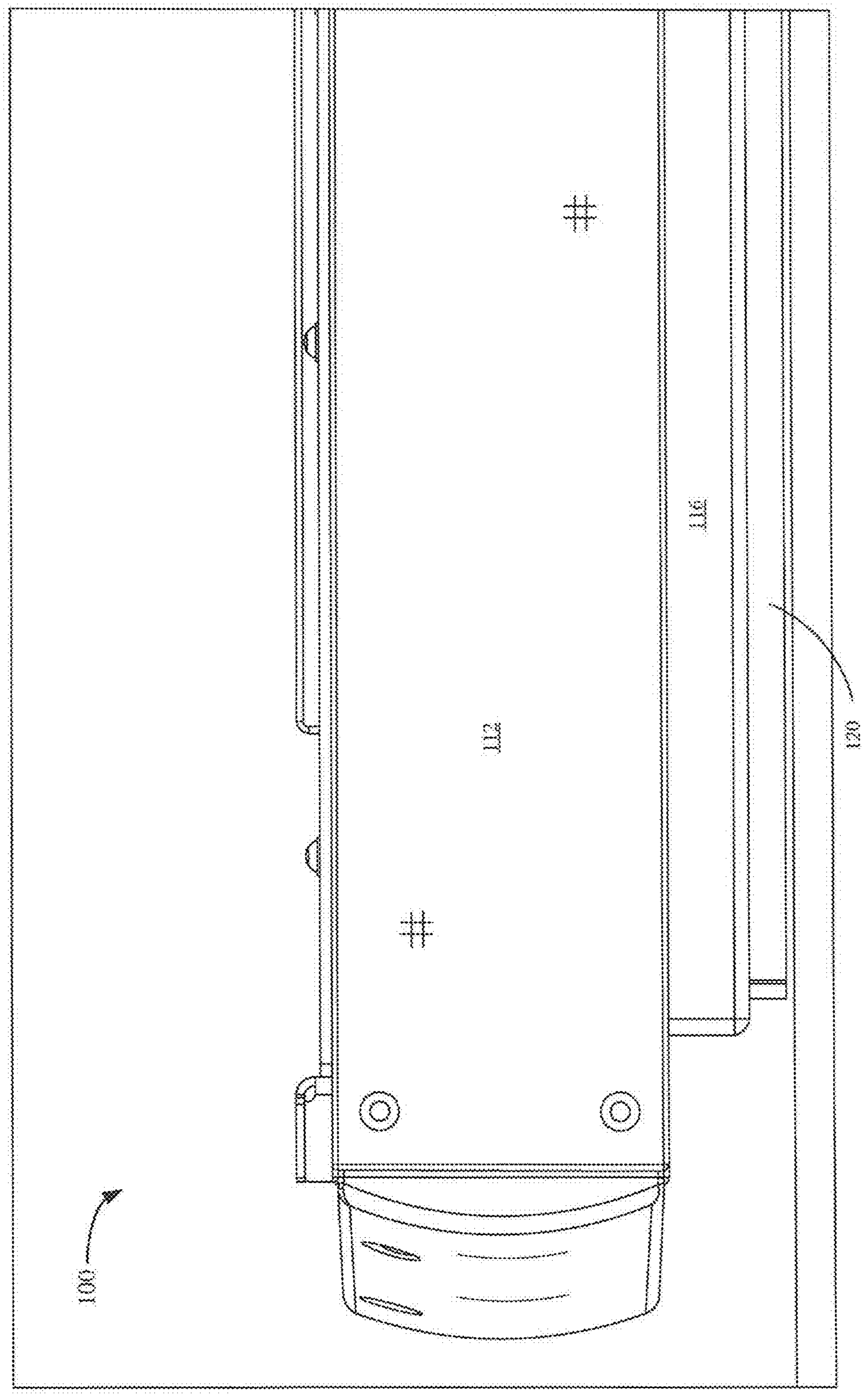
FIG. 6 is a component view showing an example swing in a neutral swing position.

FIG. 6 is a component view showing an example swing 100 in a neutral swing position. In this view the overlap of platform 112 and skirt 116 is greatly increased since skirt 116 is still on the ground and platform 112 is closer to the ground. In this instance, platform 112 is three inches closer to the ground.

Figure 7:
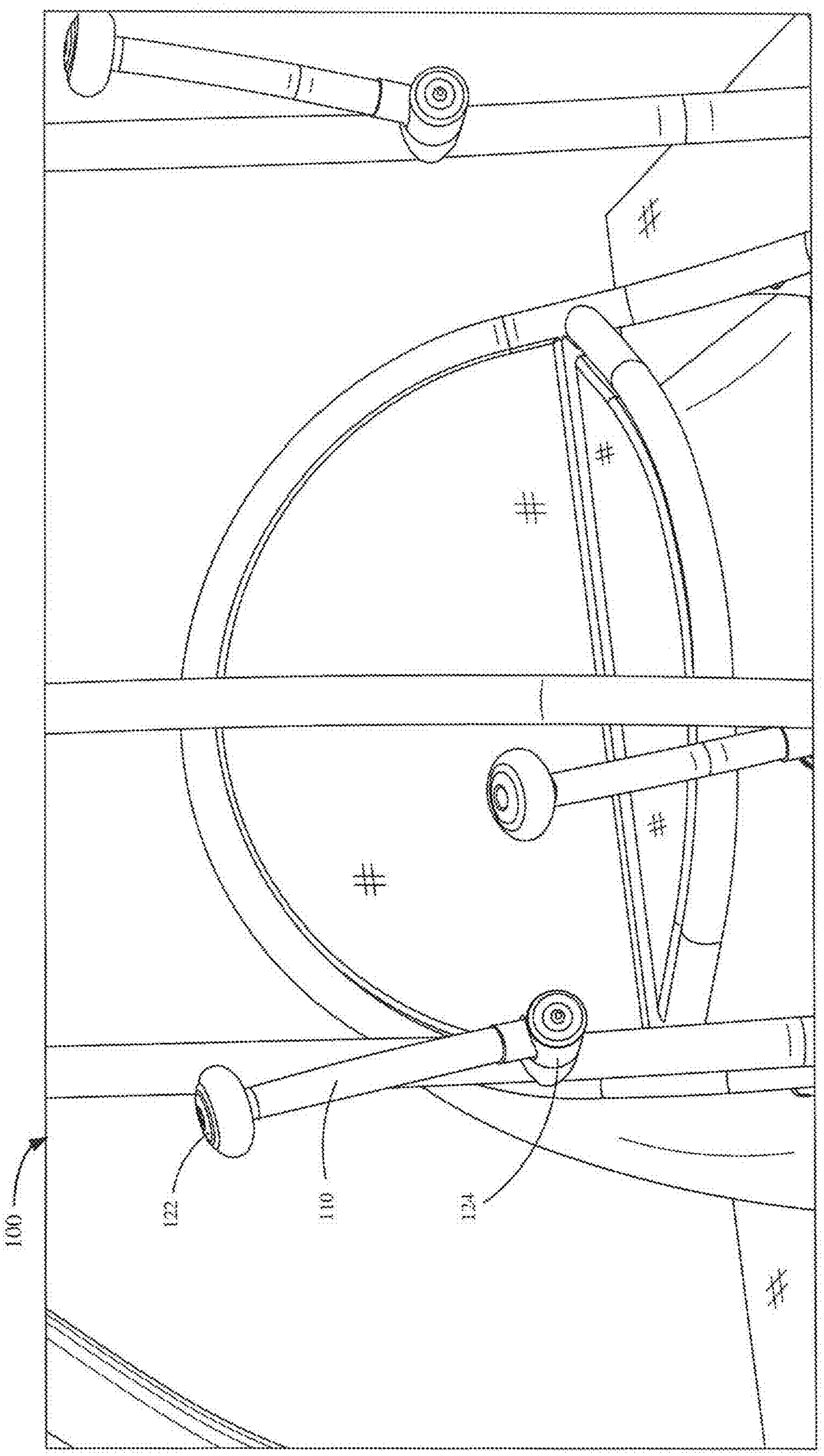
FIG. 7 is perspective view showing an example swing with the support bars up.
Figure 8:
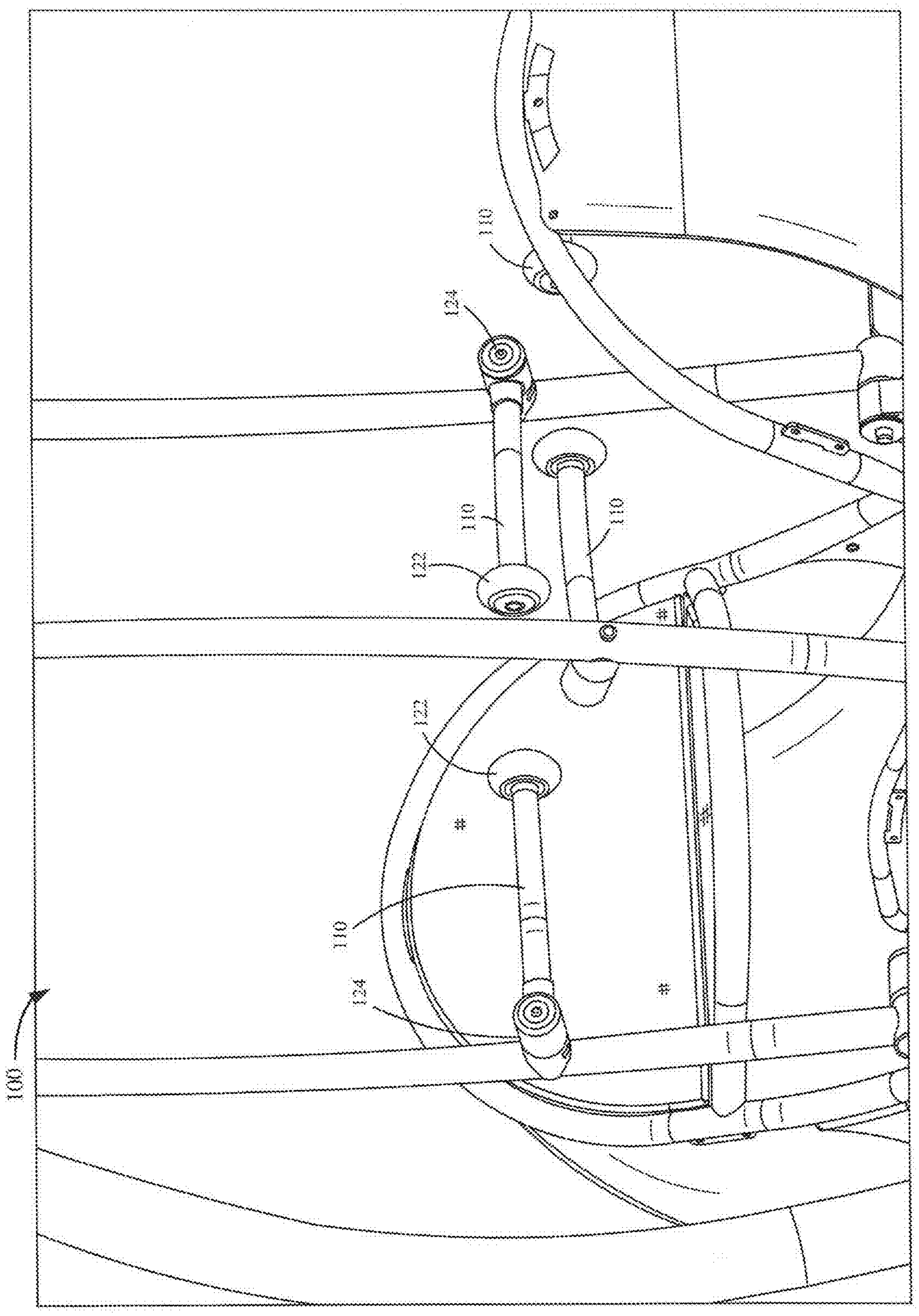
FIG. 8 is perspective view showing an example swing with the support bars down.

FIG. 7 is perspective view showing an example swing 100 with the support bars 110 up. Support bar(s) 110 are provided to keep a user in place during movement of platform 112. In this view, support bar 110 is in an up position such that a user can access user areas 108. For example, a user can sit on the seat or position a wheelchair proximate support bar 110. Support bar 110 includes a bumper 122 to reduce impact on any object that might get in the way of support bar 110. Support bar 110 is coupled to swing arms 114 by hinge 124. Because support bar 110 is coupled to swing arms 114 it allows a user, with a rowing/pushing/pulling motion, to swing platform 112 while being on platform 112. In other examples, support bar 110 is coupled to a seat in user area 108. FIG. 8 is perspective view showing an example swing with the support bars down. In this view a user can grab support bar 110 to impart a force that causes platform 112 to swing.

Figure 9:
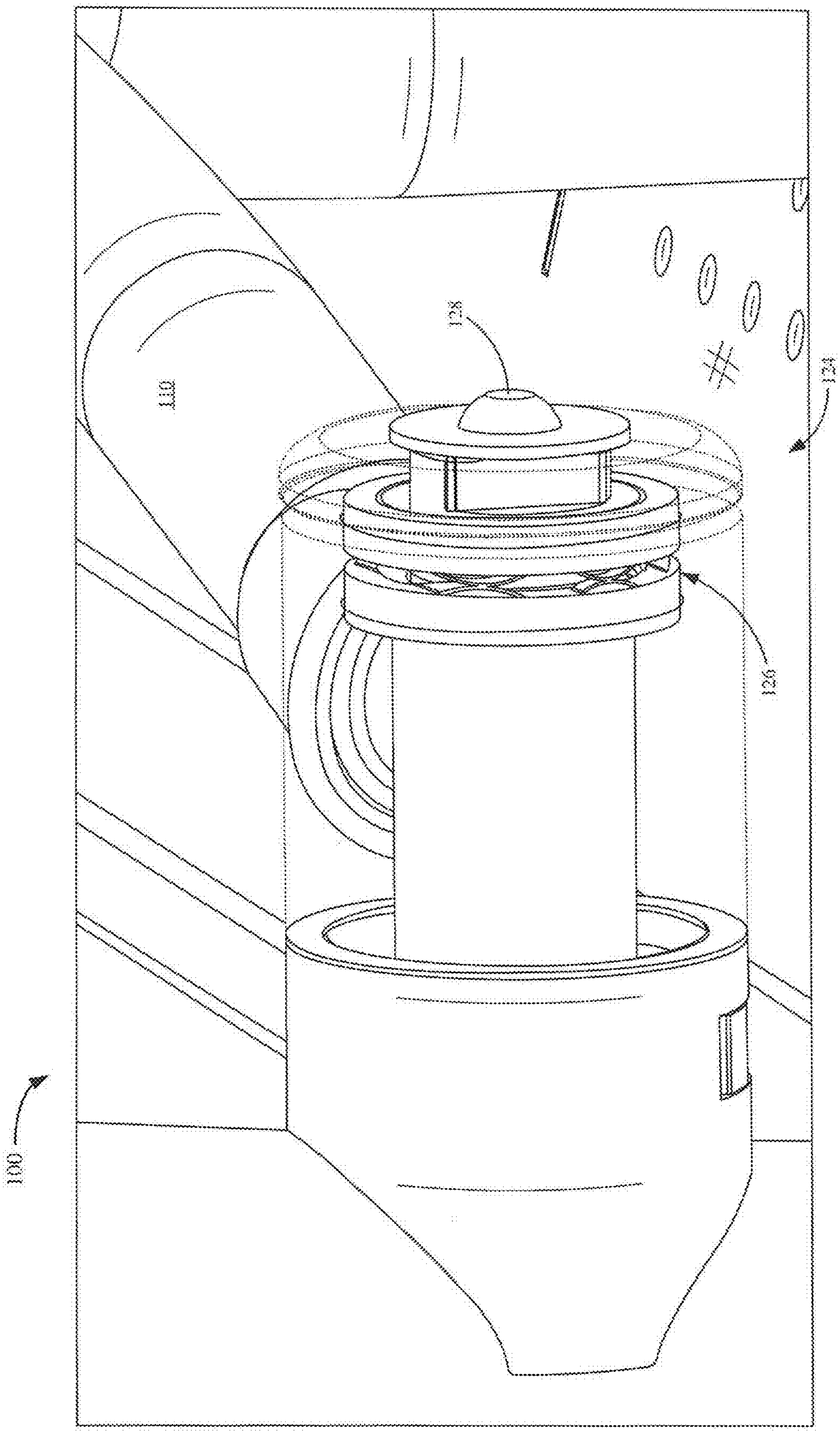
FIG. 9 is a component view showing a support bar.

FIG. 9 is a component view showing a support bar. In this view, hinge 124 is shown with transparency to show one example of a friction device 126 that impedes movement of support bars 110. In this case, friction device 126 includes a spring and belting material. Tightening fastener 128 can increase the friction enacted by friction device 126. In other examples, friction device 126 can include fewer or other items as well. In some examples, a force other than friction is used to impede movement of support bars 110.

Figure 10:
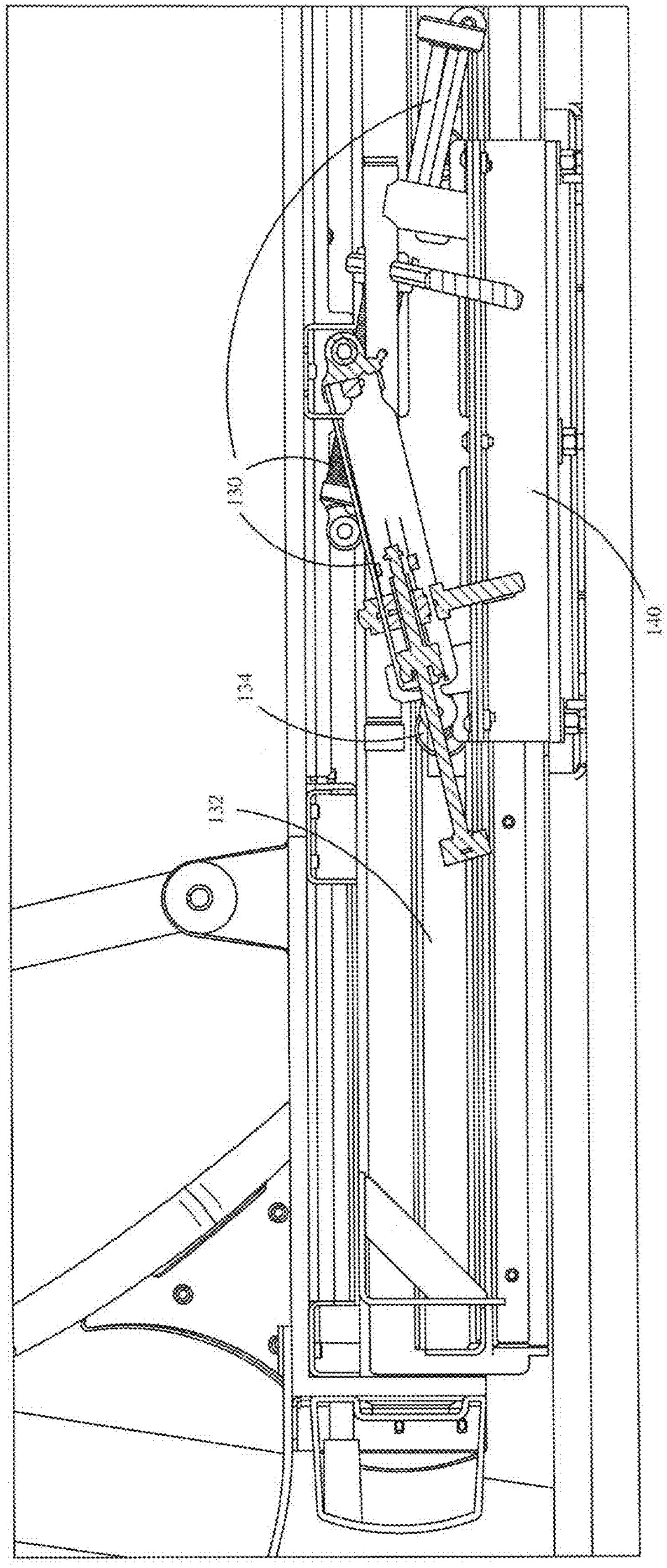
FIG. 10 is a sectional view showing an example swing.

FIG. 10 is a sectional view showing an example swing 100. As shown, a section has been taken along the length of platform 112. Here ground device 140 is visible. Ground device 140 is coupled to the ground. In one example, ground device 140 is coupled to the ground via a concrete footing. Ground device 140 can be coupled to the ground in other ways as well. Ground device 140 includes roller guides 134 that coupled to rail 132 of skirt 116. Roller guides 134 as shown include urethane or nylon components and ball bearings. In other examples, roller guides 134 can include other items as well. Roller guides 134 remain stationary with ground device 140 and guide skirt 116 (via rail 132) as it moves back and forth with swinging platform 112. The contact with roller guides 134, in one example, only allow travel of skirt 116 in one axis that is parallel with the ground. In other examples, roller guides 134 can allow some travel in other dimensions as well. For instance, to allow skirt 116 to follow an uneven surface.

Also shown are shock absorbing systems 130. In the shown example, shock absorbing systems 130 include six-inch travel pneumatic cylinders. Upon approaching a swing limit, platform 112, skirt 116 and/or another component contacts the shaft of the pneumatic cylinders. As the shaft is pushed back into the cylinder an increasing deceleration force is applied to decelerate platform 112 slowly without creating a jarring effect that would be present if platform 112 contacted a solid object. Of course, other deceleration means also be present, such as compressible materials like rolled belting material, air brake, tires, etc.

Figure 11:
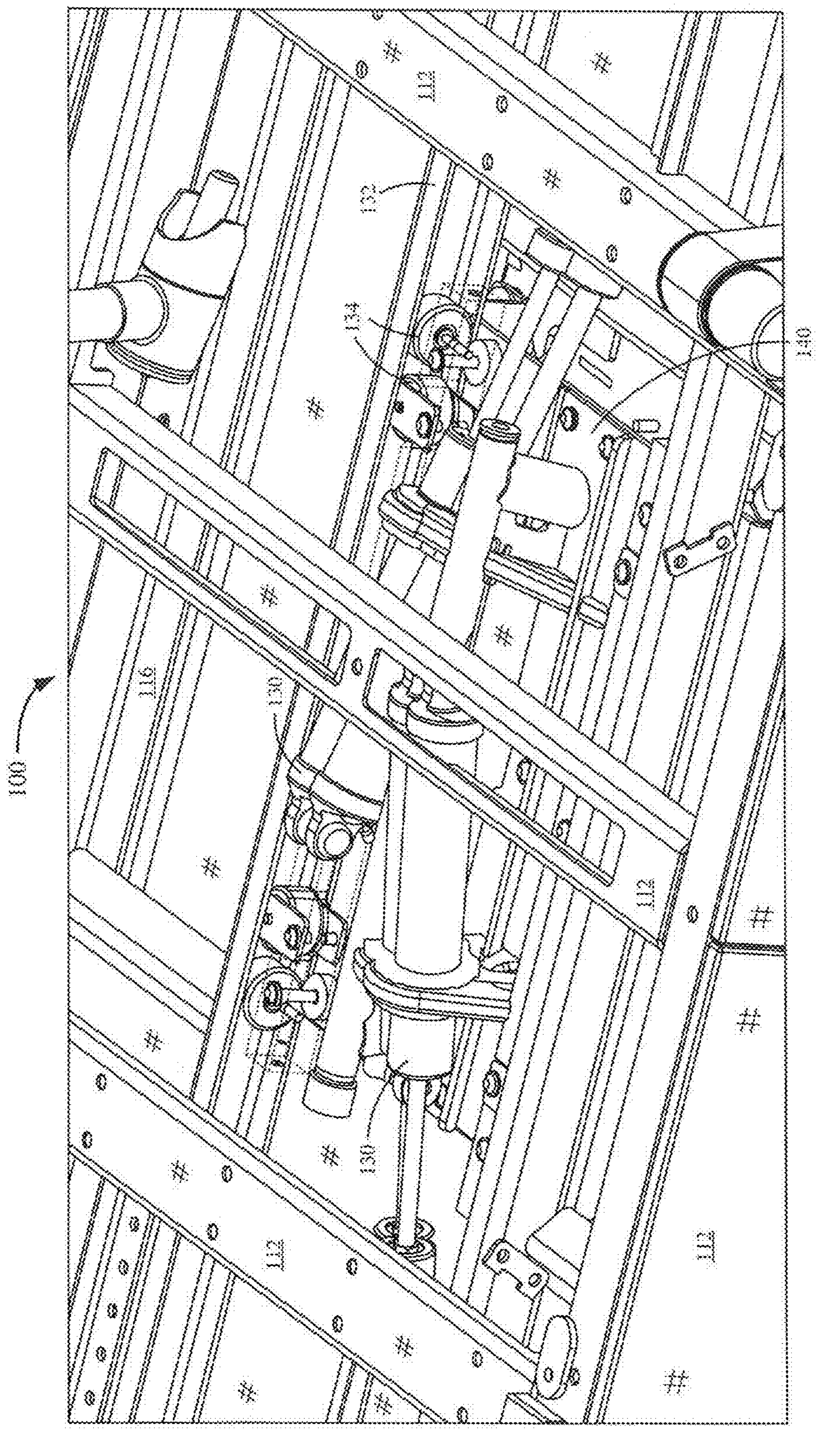
FIG. 11 is a component view showing an example rail and shock absorbing system.

As shown, only skirt 116 is supported by ground device 140 and platform 112 is supported from above by frame 106. In other examples, platform 112 can also be supported, at least in part, by ground device 140. FIG. 11 is a component view showing an example platform, skirt assembly.

Figure 12:
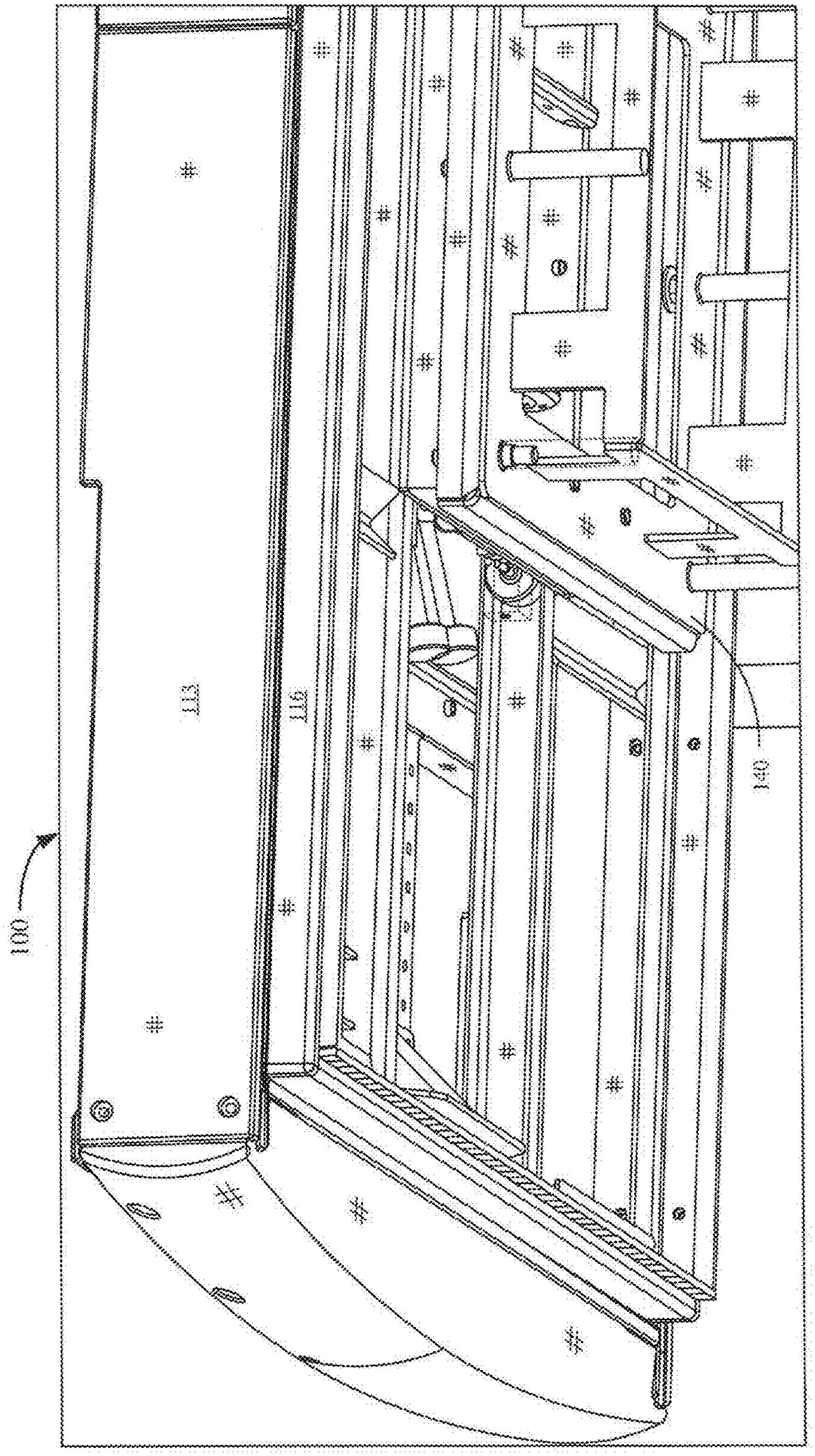
FIG. 12 is a bottom perspective view showing an example swing.

FIG. 12 is a bottom perspective view showing an example swing 100. In this view, the fitting between platform 112 and skirt 116 is visible. In some examples, a friction reducing device can be provided between platform 112 and skirt 116. For example, a set of roller bearings in either platform 112 and or skirt 116. Or for example, some low friction materials are used on the surfaces where platform 112 contacts skirt 116. Of for example, a lubricant is applied between platform 112 and skirt 116. As shown, there is not a physical mechanism attaching platform 112 to skirt 116. Skirt 116 merely fits within the frame/panels of platform 112 and moves with platform 112 due to this contact. In other examples, there may be a physical mechanism attaching platform 112 and skirt 116.

Figure 13:
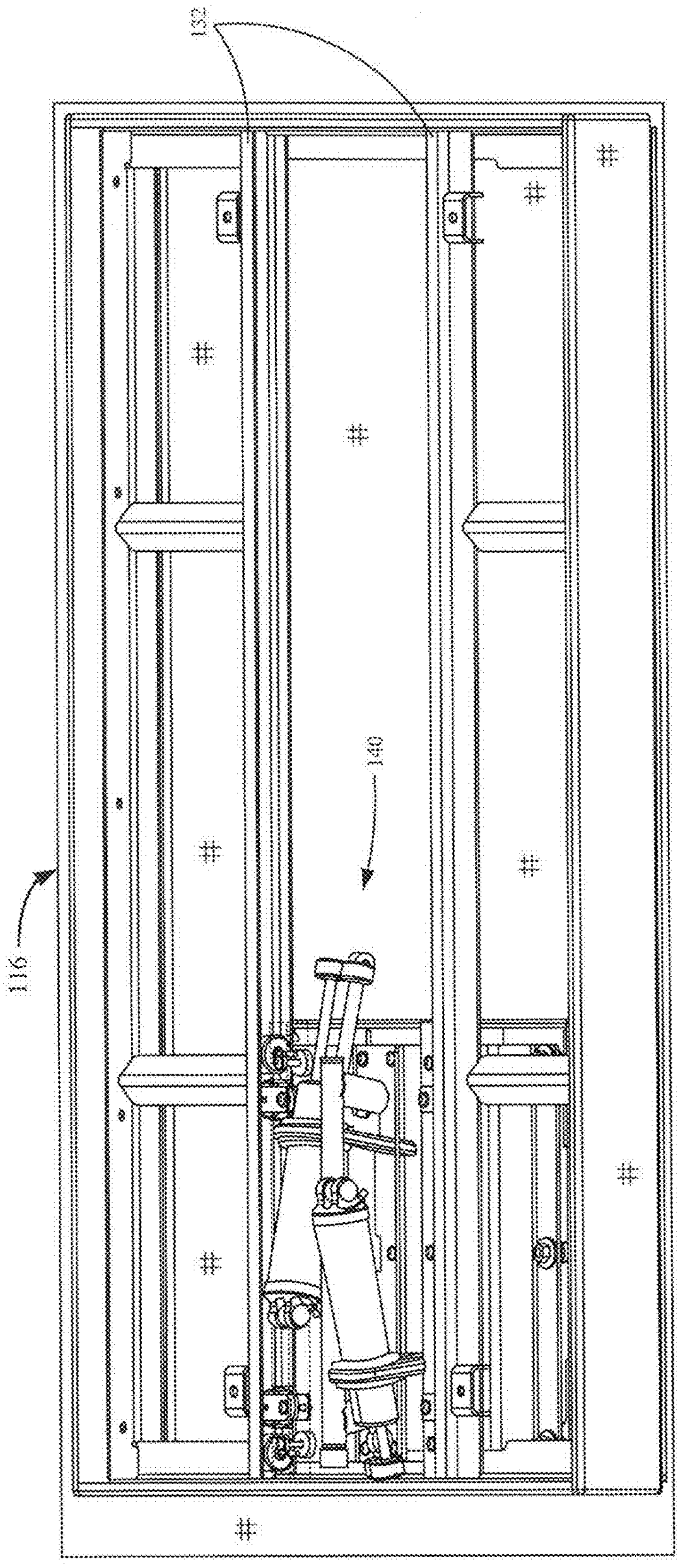
FIG. 13 is a top perspective view showing an example skirt.

FIG. 13 is a top perspective view showing an example skirt 116. As shown, rail 132 is part of skirt 116. In other examples, rail 132 is part of ground device 140 and rollers 134 are part of skirt 116. As shown, shock absorbing system 130 are coupled to ground device 140. In other examples, shock absorbing system 130 is coupled to skirt 116 and/or platform 112.

Figure 14:
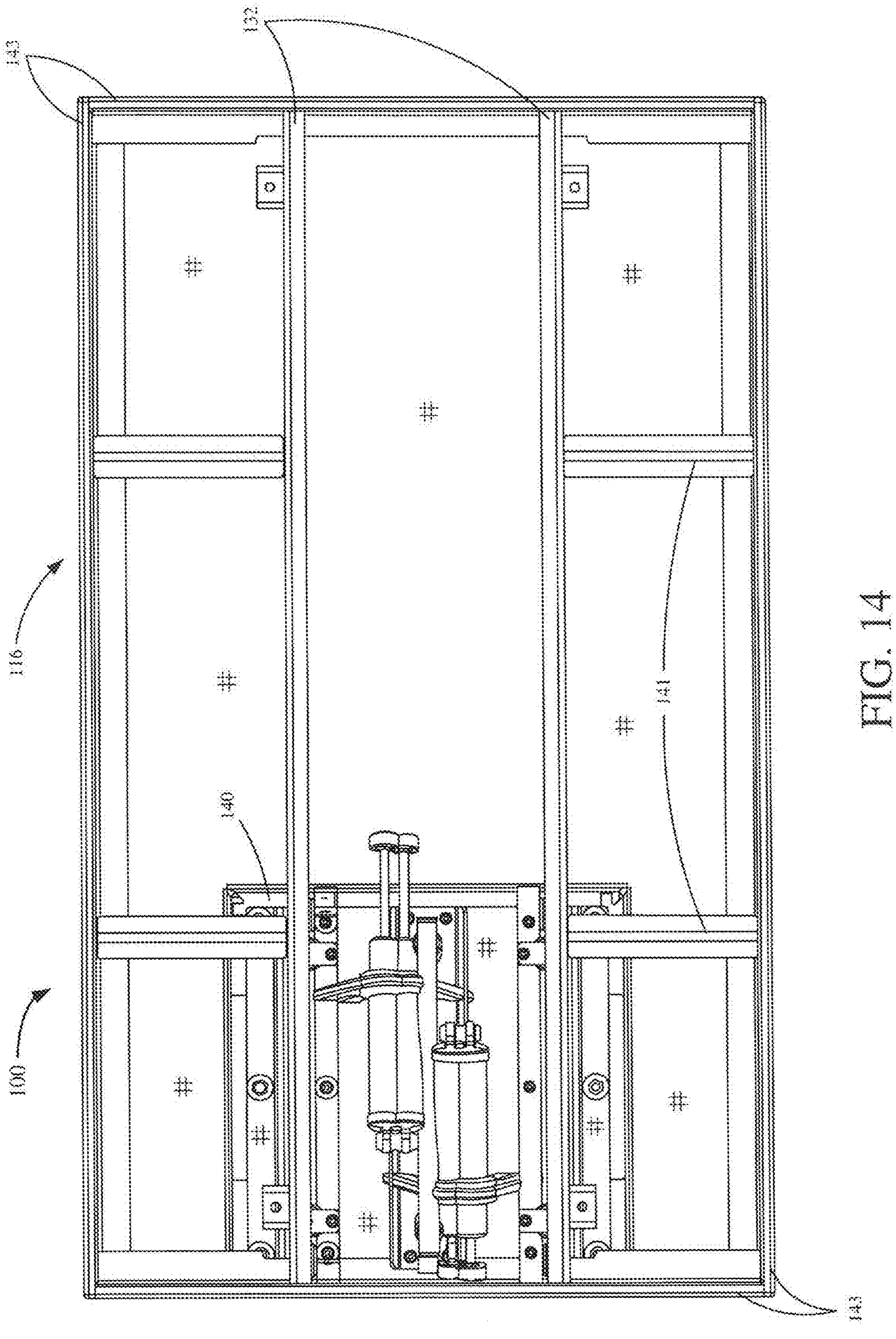
FIG. 14 is a top view showing an example skirt.

FIG. 14 is a top view showing an example skirt 116. Skirt 116 includes four walls 143 in a rectangular structure. The walled structure formed by walls 143 fill an area below platform 112. In some instances, the walls 143 fill the entire area below platform 112 that the area is substantially inaccessible. In other examples, walls 143 fill an area below platform 112 that is less than the entire area below platform 112. As shown, skirt 116 includes a frame coupled to rail 132. This frame includes four braces 141. In other examples, the frame could include more or fewer braces 141. In other examples, the frame includes other components. In this view, the rectangular shape of skirt 116 and platform 112 can be seen. In other examples, platform 112 and skirt 116 can be in a different shape as well. For example, an ellipse, an oval, a circle, a square, a star, etc.

Figure 15:
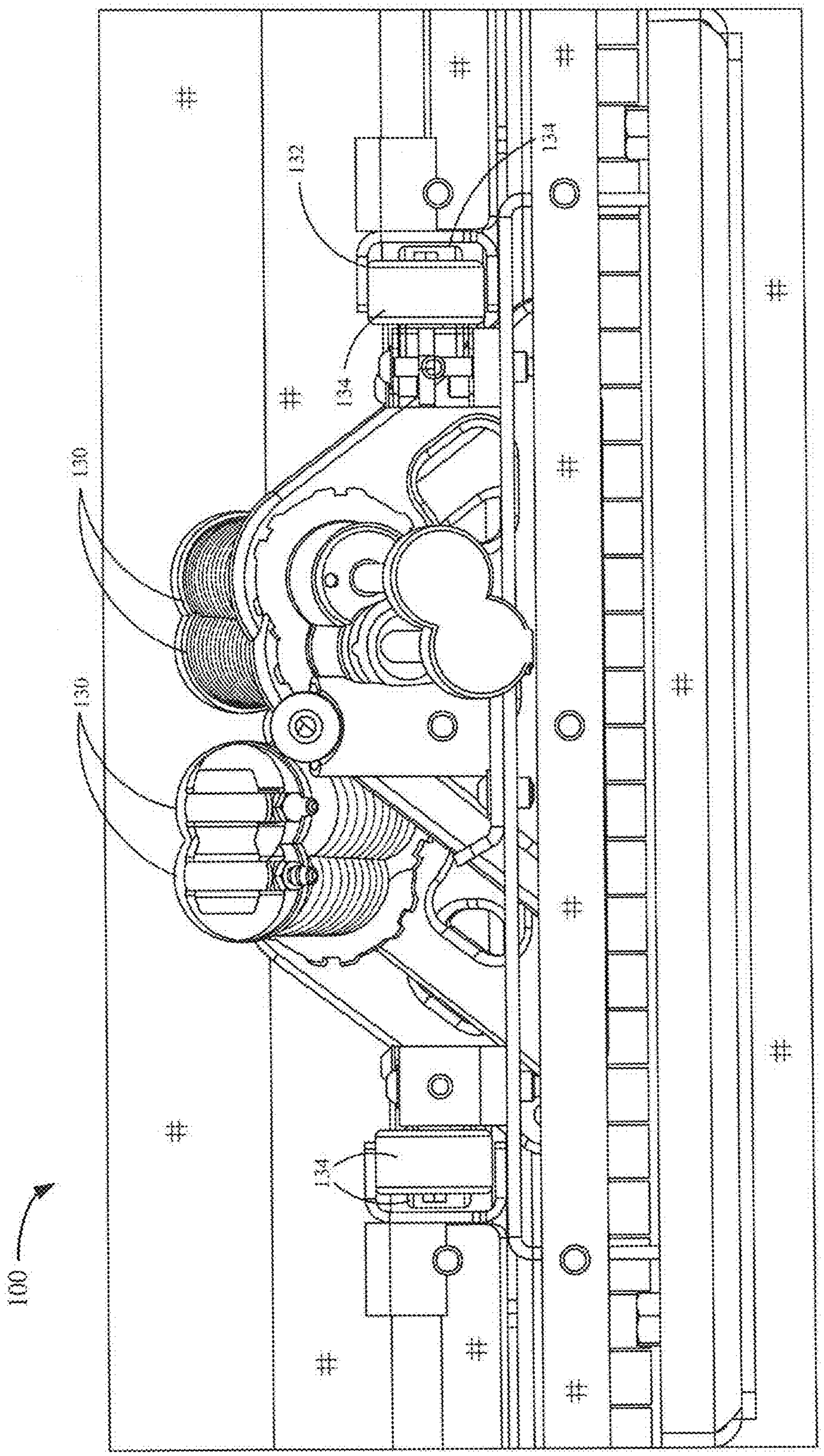
FIG. 15 is a front component view showing an example skirt.

FIG. 15 is a front component view showing an example skirt 116. As shown in this figure there are rollers 134 in two different orientations in each rail 132. This reduces movement in more than one axis. For instance, one orientation prevents movement in one axis and the second, perpendicular, orientation prevents movement in a second axis that is substantially perpendicular to the first axis. In some examples, rollers 134 may be adjustable as to tighten the roller against rail 132 and reduce “slack” or backlash. In some examples, rollers 134 that adjust the vertical axis allow for downward movement of skirt 116, such that it can follow a surface that is not completely perpendicular with rail 132.

Figure 16:
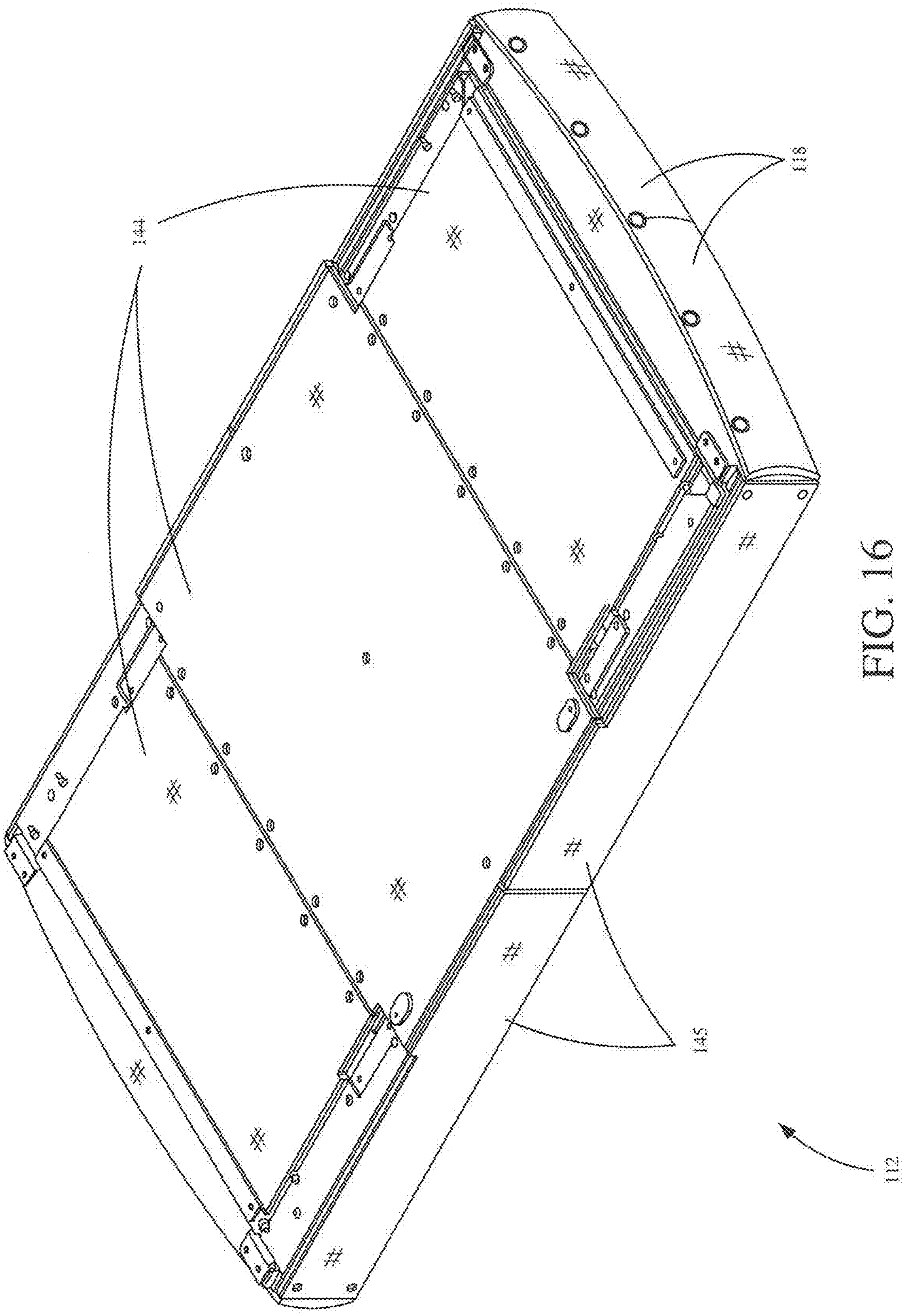
FIG. 16 is a perspective view showing an example platform.

FIG. 16 is a perspective view showing an example platform. As shown, platform 112 includes three surface panels 144. In other examples, there are a different number of panels 144. Panels 144 can include a weatherproof material. As shown, platform includes two bumpers 118 per side. In other examples, there are a different number of bumpers 118. As shown, platform 112 includes two side panels 145 on each side. In other examples, there are a different number of side panels 145.

Figure 17:
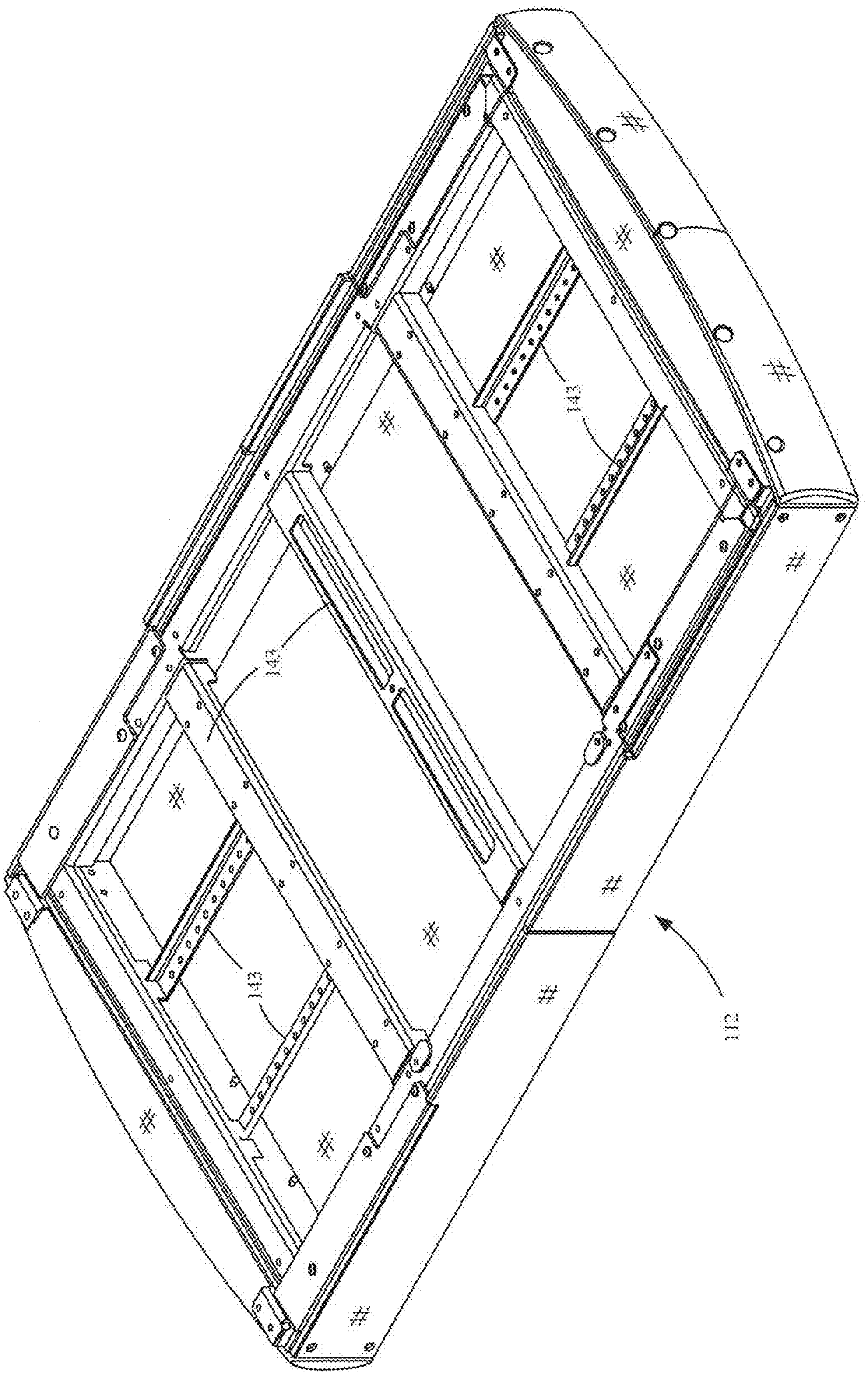
FIG. 17 is a perspective view showing an example platform with the surfacing removed.

FIG. 17 is a perspective view showing an example platform with the surfacing removed. In this view, framing components 143 is visible. In other examples, a different number of framing components 143 may be provided.

Figure 18:
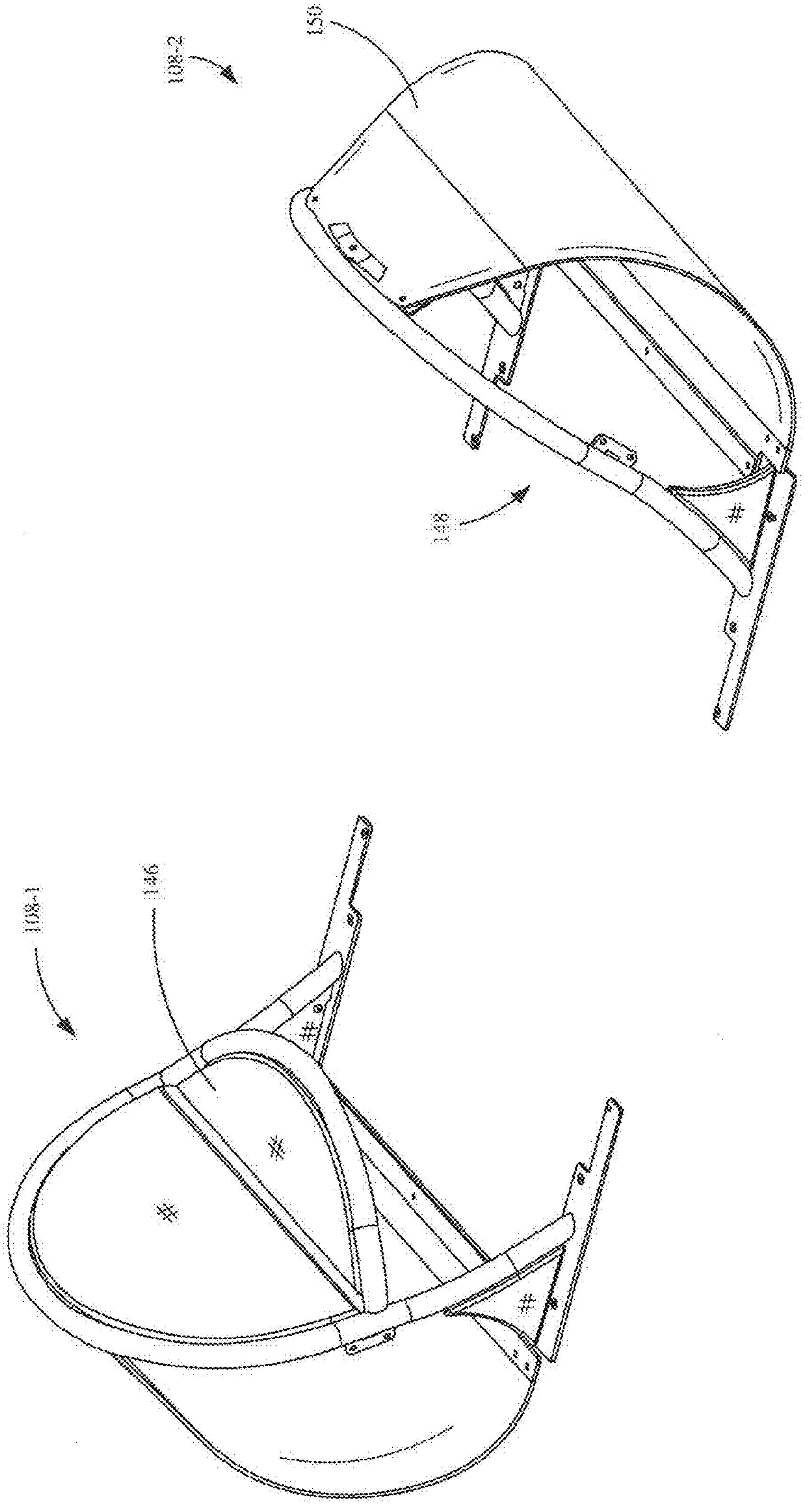
FIG. 18 is a perspective view showing example seat assemblies.
Figure 19:
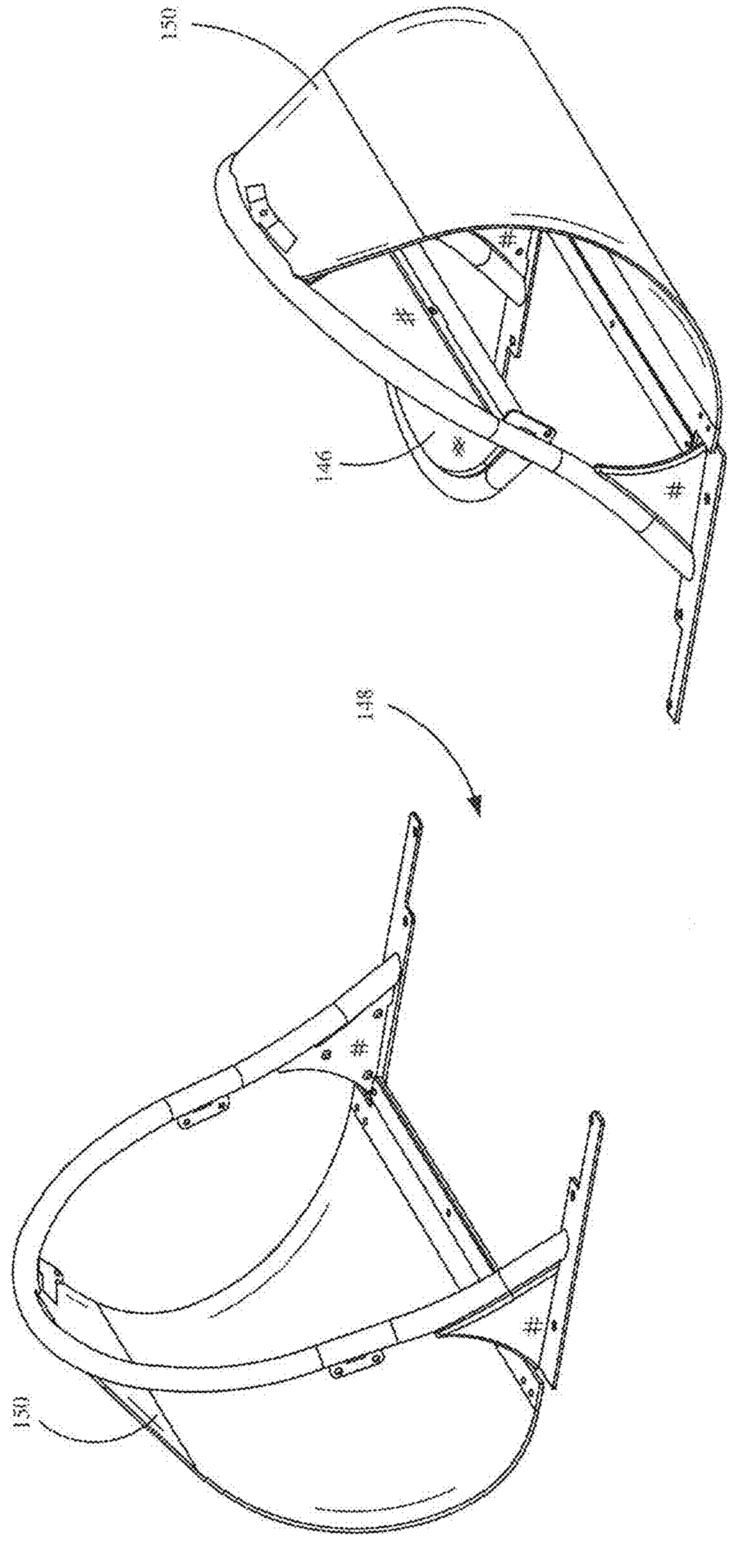
FIG. 19 is a perspective view showing example seat assemblies.

FIGS. 18 and 19 are a perspective views showing example user areas 180-1 and 108-2, collectively referred to as user areas 108. User area 108-1 incudes a seat 146 for a user to sit. User area 108-2 includes a bay 148 where a user can stand or where a chair can be placed for a user to sit in. As shown, there is user area 108-1 and a user area 108-2. In other examples, there may be two user areas 108-1 and no user area 108-2. In other examples, there may be two user areas 108-2 and no user area 108-1. Both areas 108 include a back 150 that helps prevent objects from falling off platform 112. Back 150 can also provide some padding incase platform 112 contacts an object while swinging. Back 150 can also help keep a wheelchair in place on platform 112. The combination of back 150 (or an alternative component) and support bars 110 alone may be enough to hold a wheelchair-based user in place on platform 112. In other examples, other securing mechanisms may be used, such as but not limited to straps, hooks, chains, bumps, or groves, to secure a wheelchair on platform 112.

Figure 20:
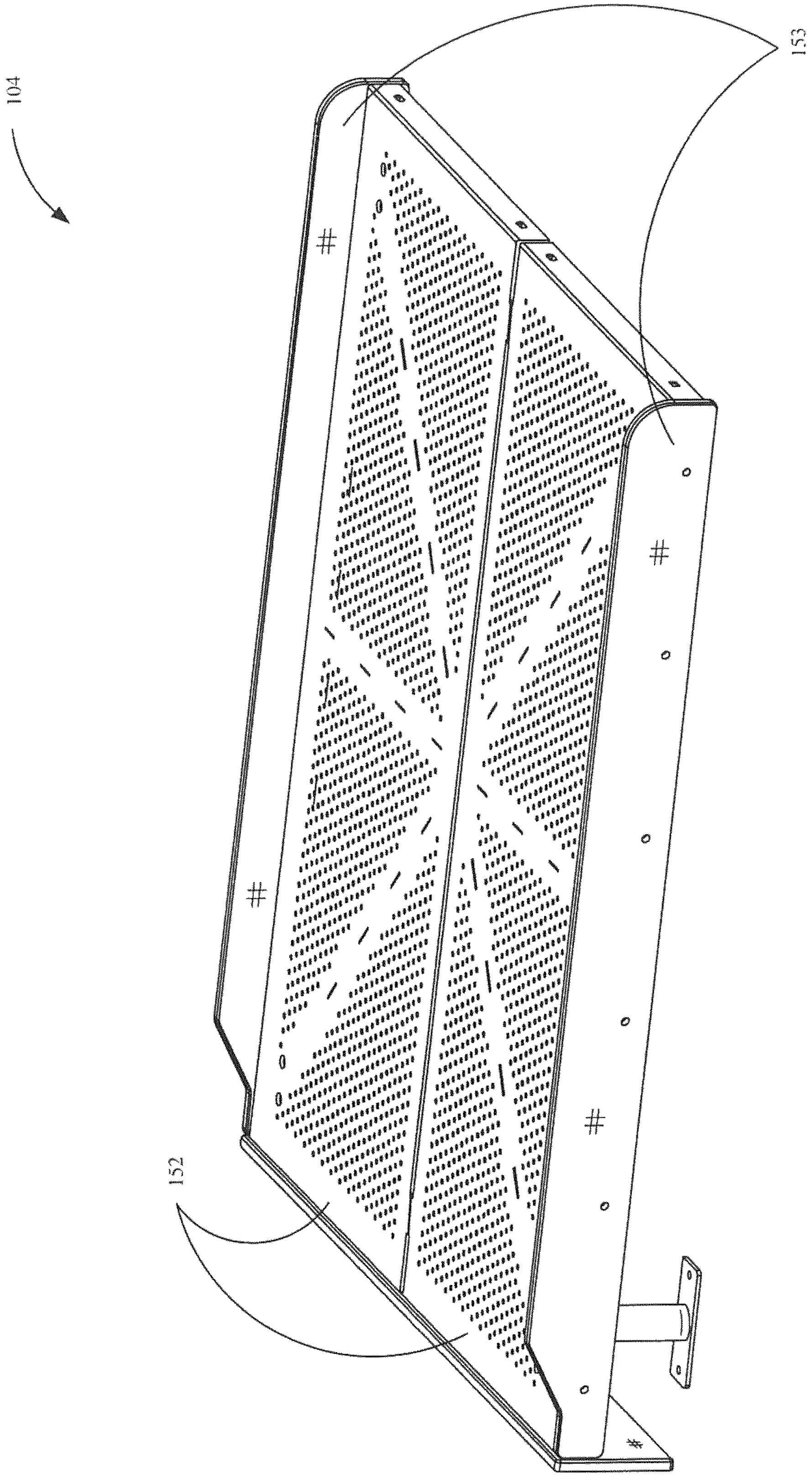
FIG. 20 is a perspective view showing an example ramp.

FIG. 20 is a perspective view showing an example ramp 104. Ramp 104 includes two panels 152. In other examples, more or fewer panels 152 could be included. Panels 152 as shown, can include drainage holes. In other examples, panels 152 can include other materials as well. Ramp 104 includes rails 153.

Figure 21:
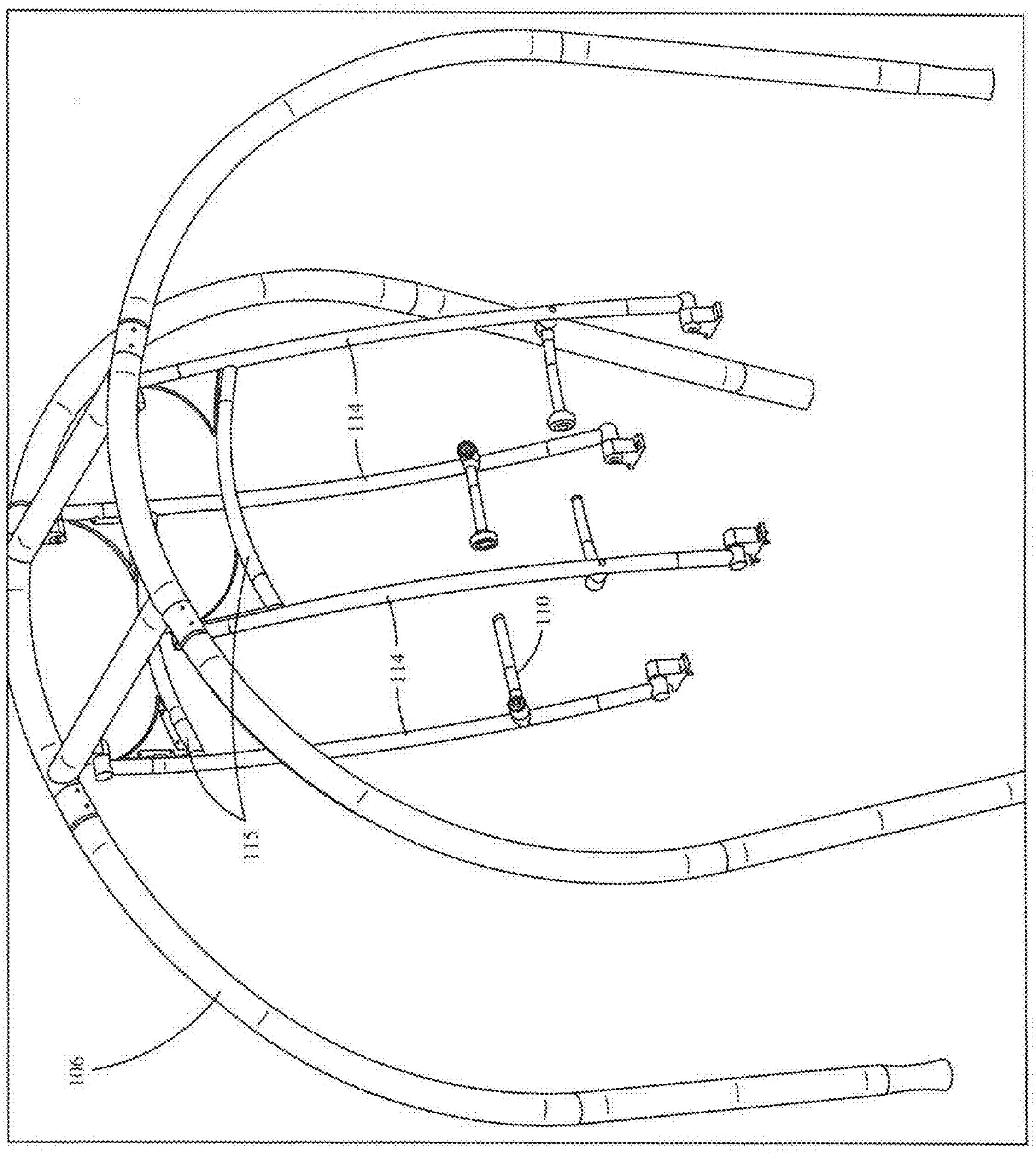
FIG. 21 is a perspective view showing an example frame and example swing arms.

FIG. 21 is a perspective view showing an example frame 106 and example swing arms 114. As shown, frame 106, swing arms 114 and support bars 110 include circular tubing. In other examples, these components can include other non-circular tubing. Opposing sets of swing arms 114 are coupled together via braces 115. In some examples, there may be a different number of braces 115.

Figure 22:
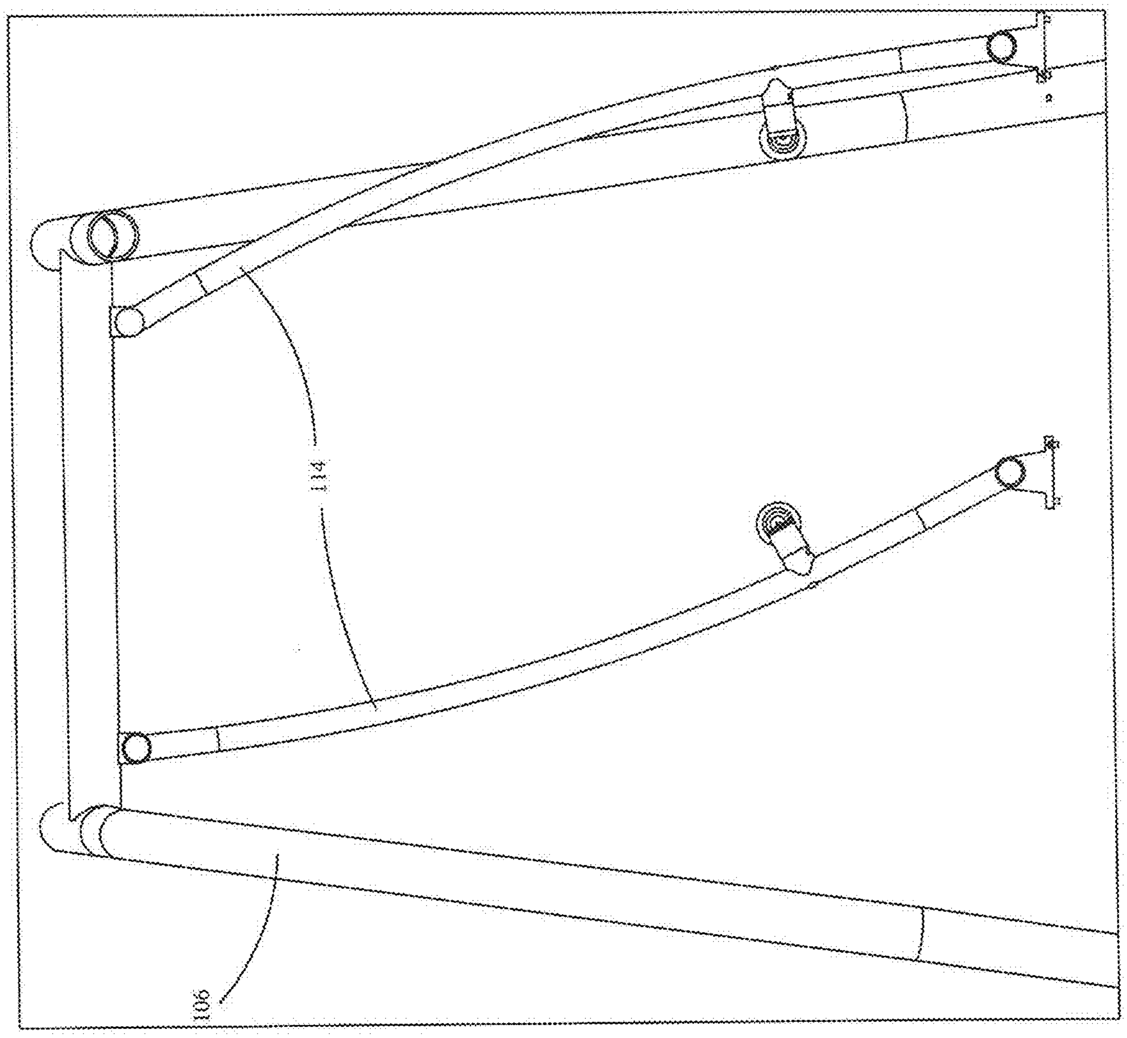
FIG. 22 is a perspective view showing an example frame and example swing arms.

FIG. 22 is a perspective view showing an example frame and example swing arms 114. As shown, swing arms 114 include a slight bend. In other examples, swing arms 114 may be straight or a have a different type of bend or shape. In some examples, swing arms 114 are shaped to improve the row-swing motion a user experiences.

Figure 23:
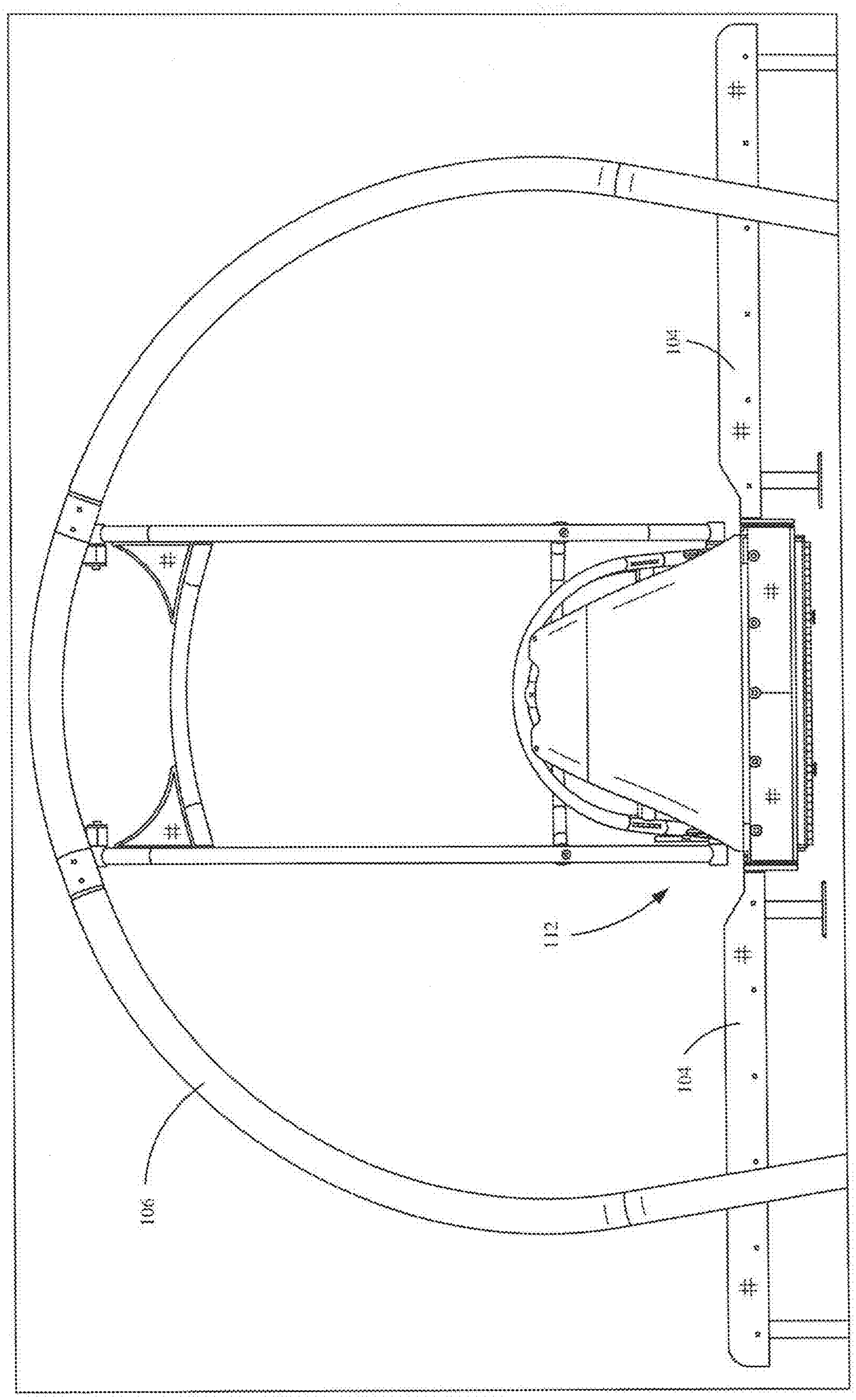
FIG. 23 is an end view showing an example swing with two ramps.

FIG. 23 is an end view showing an example swing with two ramps. As shown, stop 113 has been removed from platform 112 and two ramps 104 have been provided on either side of platform 112.

Figure 24:
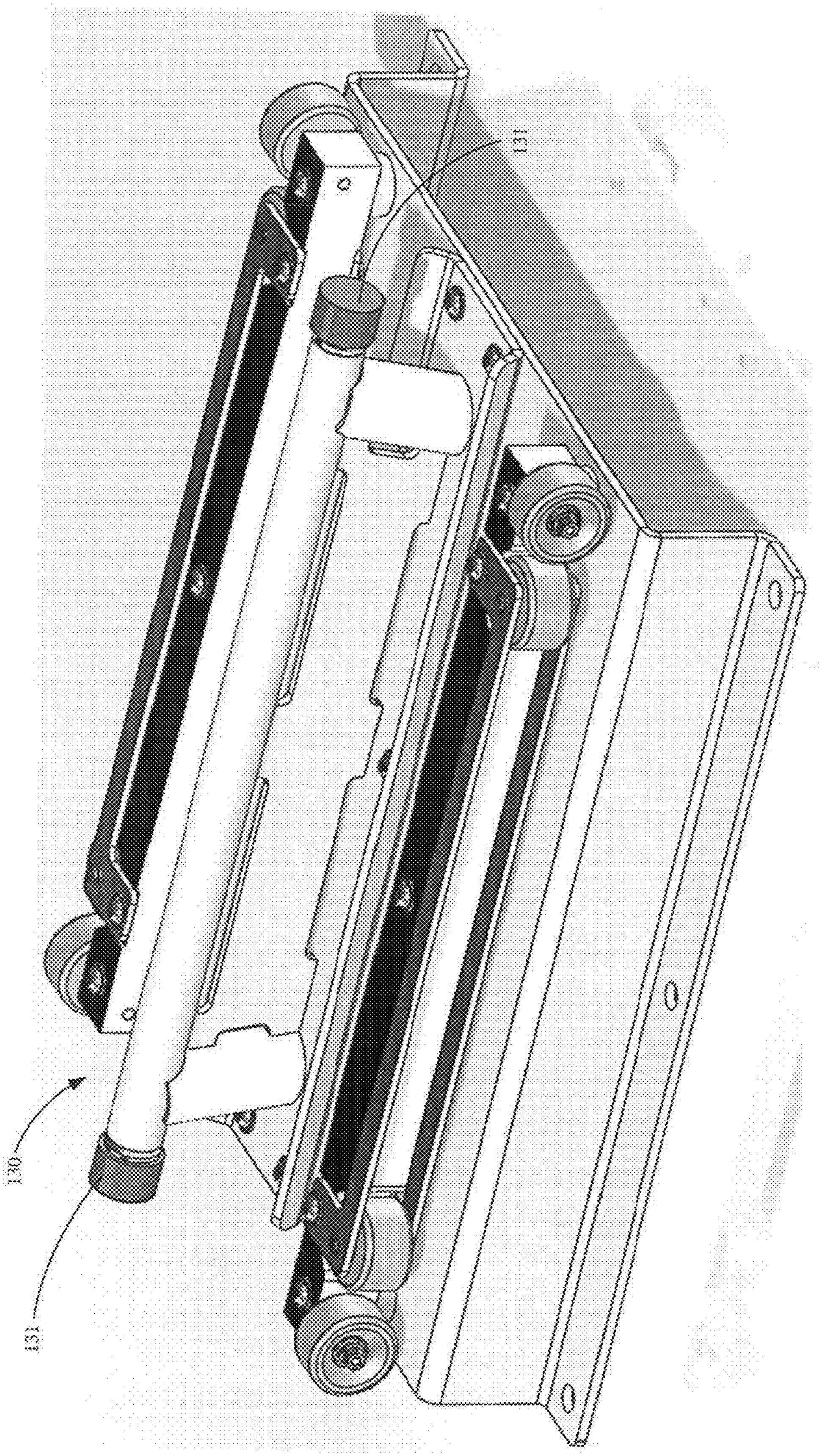
FIG. 24 is a component view showing an example shock absorbing system.

FIG. 24 is a component view showing an example shock absorbing system 130. As shown, shock absorbing system 130 includes bumpers 131 and does not include pneumatic shocks. In some examples, bumpers 130 include belting material.

Figure 25:
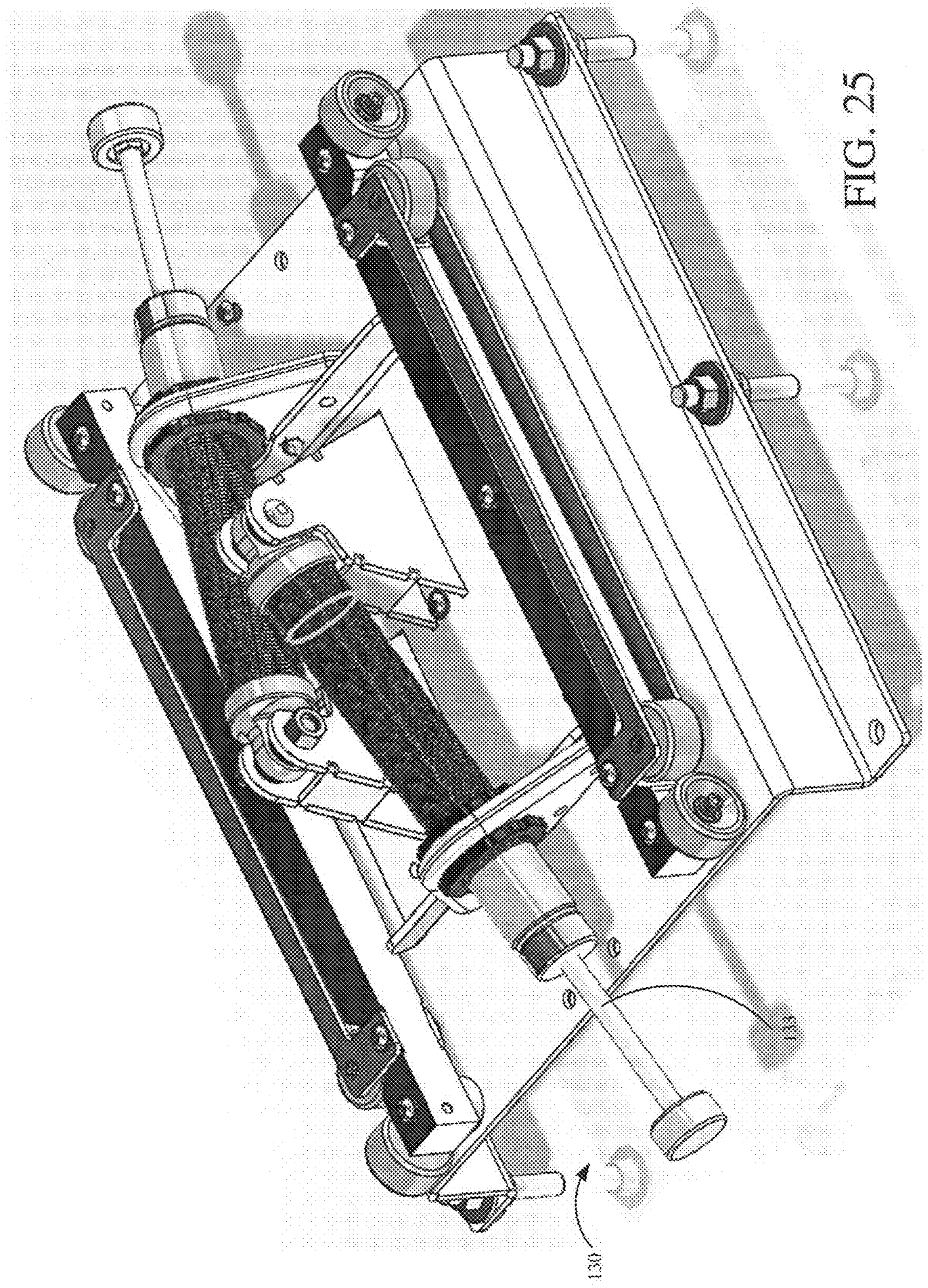
FIG. 25 is a component view showing an example shock absorbing system.

FIG. 25 is a component view showing an example shock absorbing system 130. As shown, shock absorbing system 130 includes bumpers and two pneumatic assemblies 133. In some examples, pneumatic assemblies 133 can be hydraulic assemblies. In other examples, assemblies 133 can include a different type of shock absorbing system 130.

Figure 26:
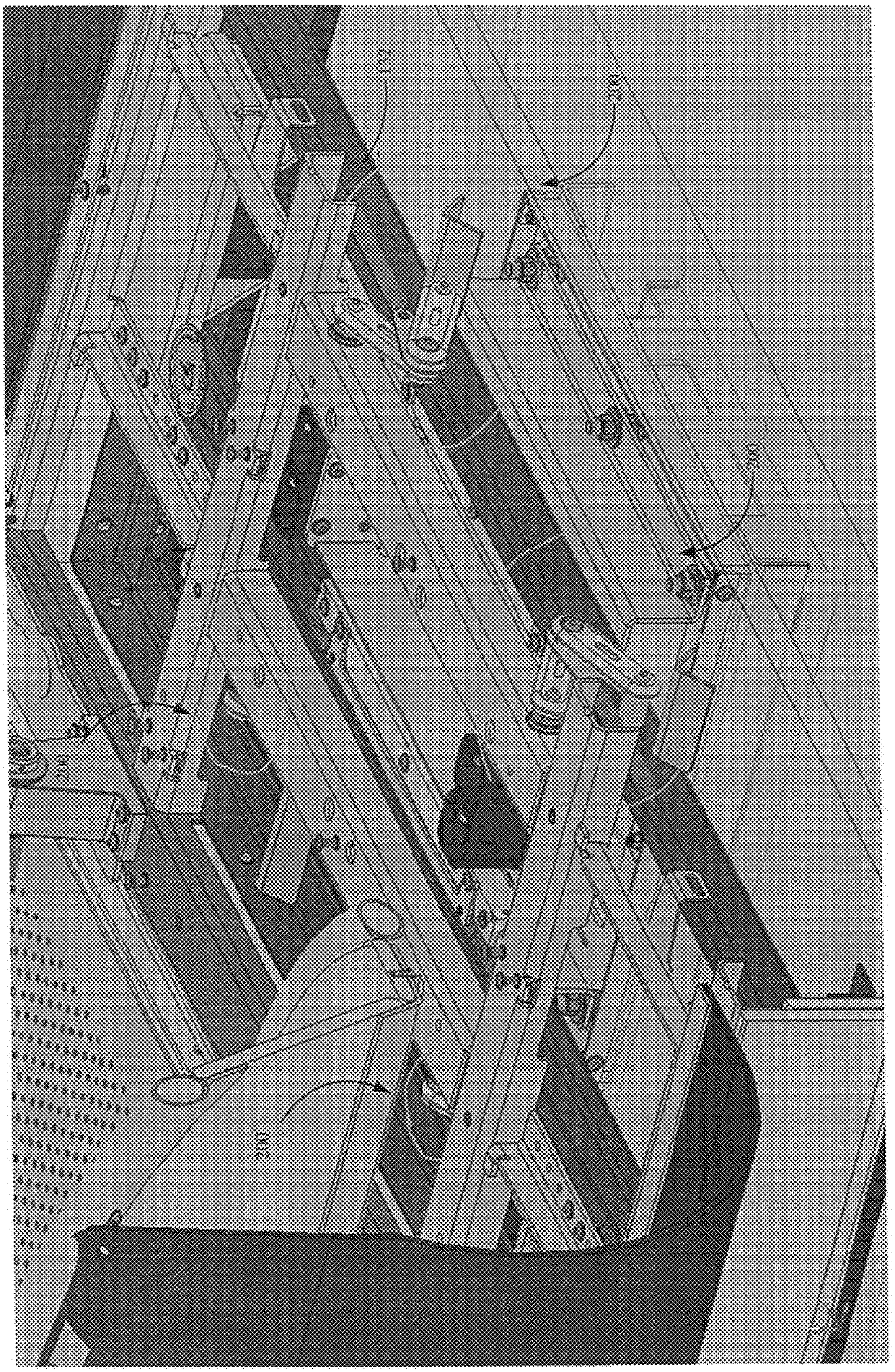
FIG. 26 is a perspective view showing an example acceleration assembly.

FIG. 26 is a perspective view showing example acceleration assemblies 200. Provided in this view are acceleration assemblies 200 that are configured to help accelerate platform 112 when a user initially applies a force on platform 112. This can able users of varying strengths and abilities to initiate the swinging motion. In some examples, the acceleration assemblies 200 also center platform 112.

Figure 27:
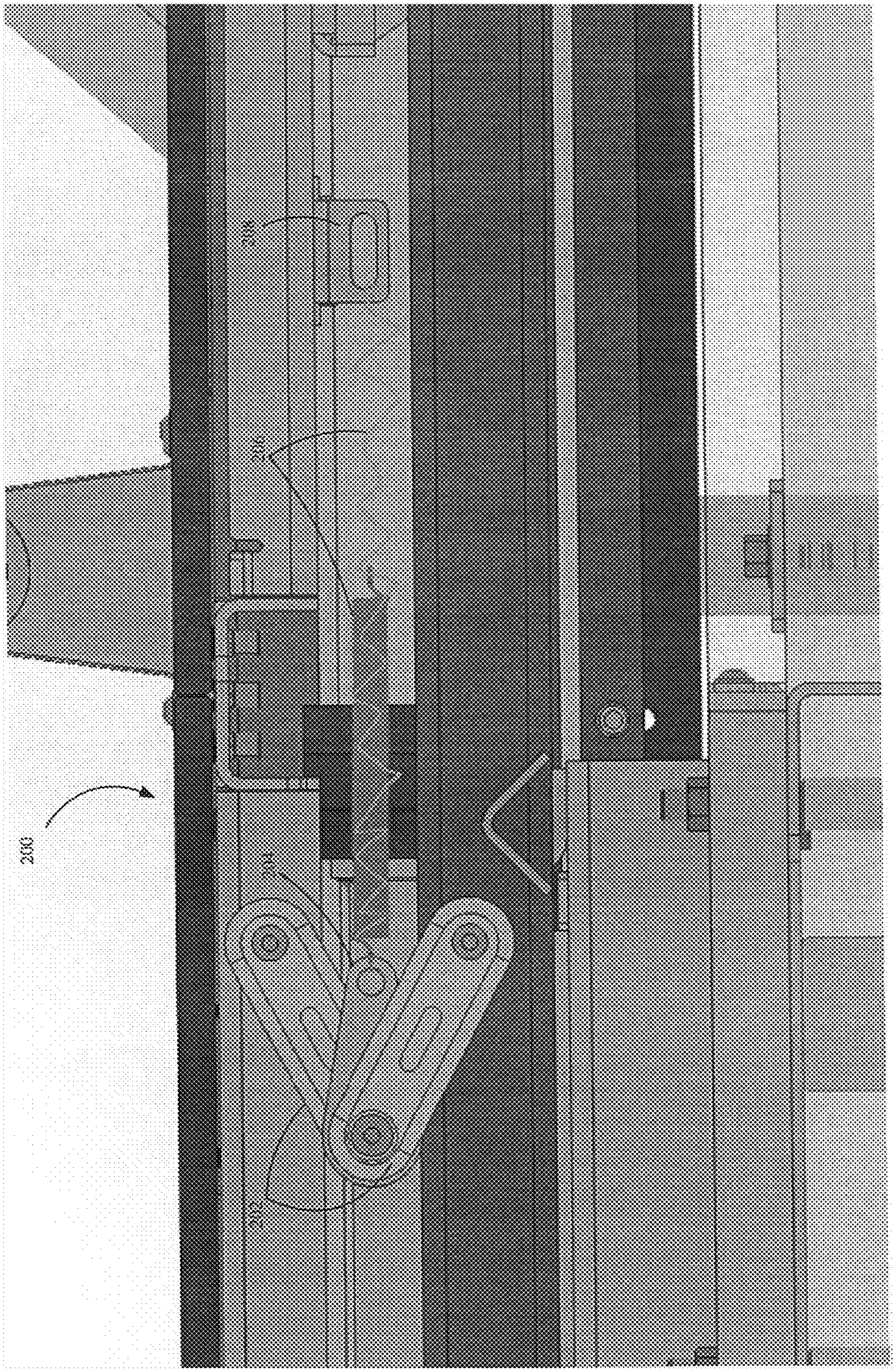
FIG. 27 is a side view showing an example acceleration assembly.

FIG. 27 is a side view showing an example acceleration assembly. Acceleration assembly 200 includes linkages 202, coupler 204, spring 206 and coupler 208. As shown, spring 206 spans between linkage coupler 204 and coupler 208. Spring 206, as shown, includes an extension spring. In other examples, spring 206 could include a different type of spring, such as a drawbar spring. In other examples, spring 206 can include any other mechanism that enacts a force between coupler 204 and coupler 208. Spring 206 applies a force on coupler 204 and thus linkages 202. The bottom linkage 202 couples to rail 132. The top linkage 202 couples to a portion of platform 112.

Figure 28:
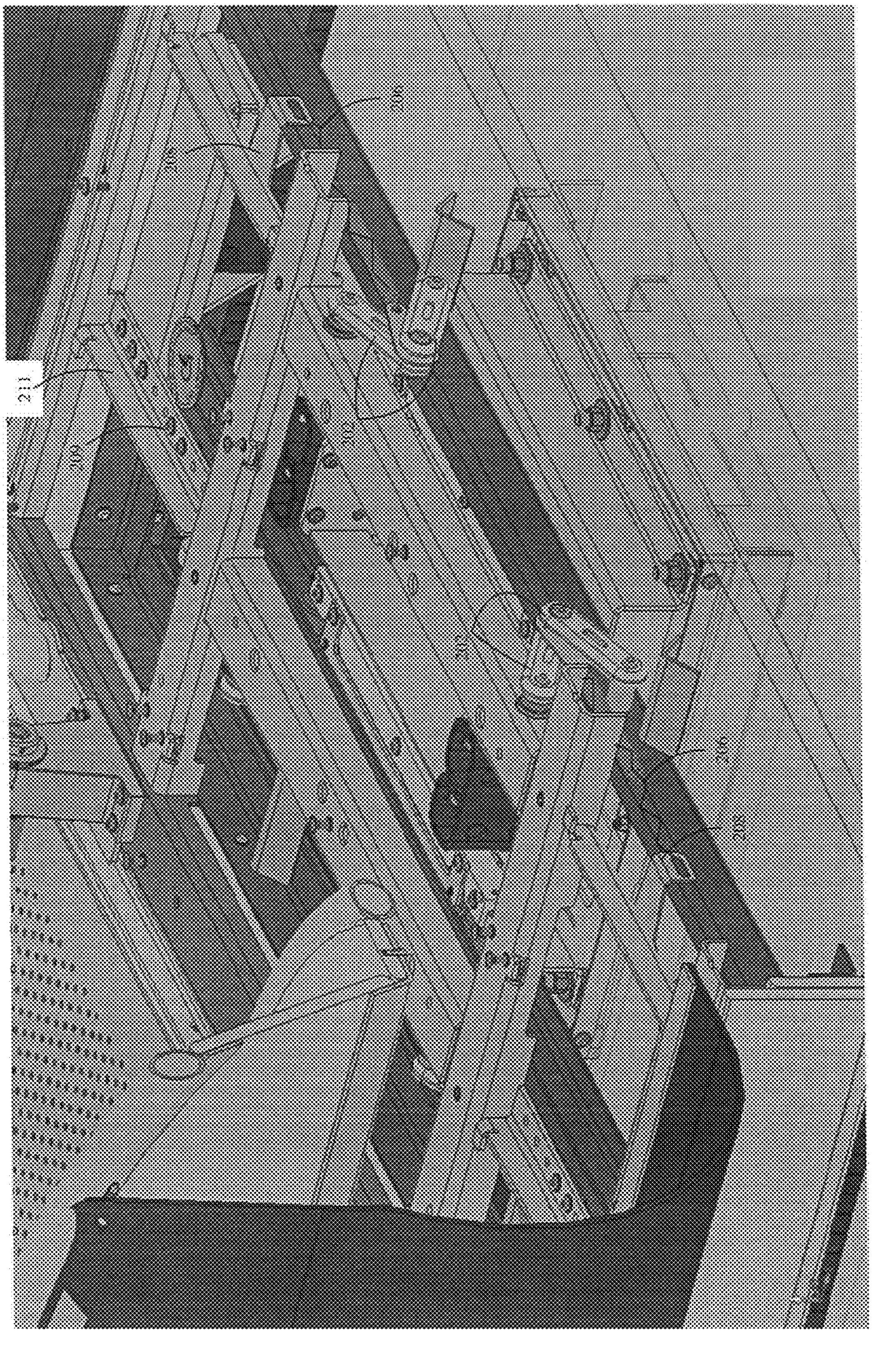
FIG. 28 is a perspective view showing an example acceleration assembly.

FIG. 28 is a perspective view showing example acceleration assemblies 200. As shown, coupler 208 is coupled to frame 211 of platform 112 by fasteners 209. In other examples, coupler 208 can be coupled to frame 211 in other ways as well. As shown, the arrangement of linkages 202 on opposing sides are oriented in opposite directions. This way as one arrangement reduces the angle between linkages 202, the opposing side arrangement increases the angle between linkages 202. The angle between linkages 202 affects the force exerted on platform 112 by springs 206. This causes the equal powered springs 206 to not cancel out one another.

Figure 29:
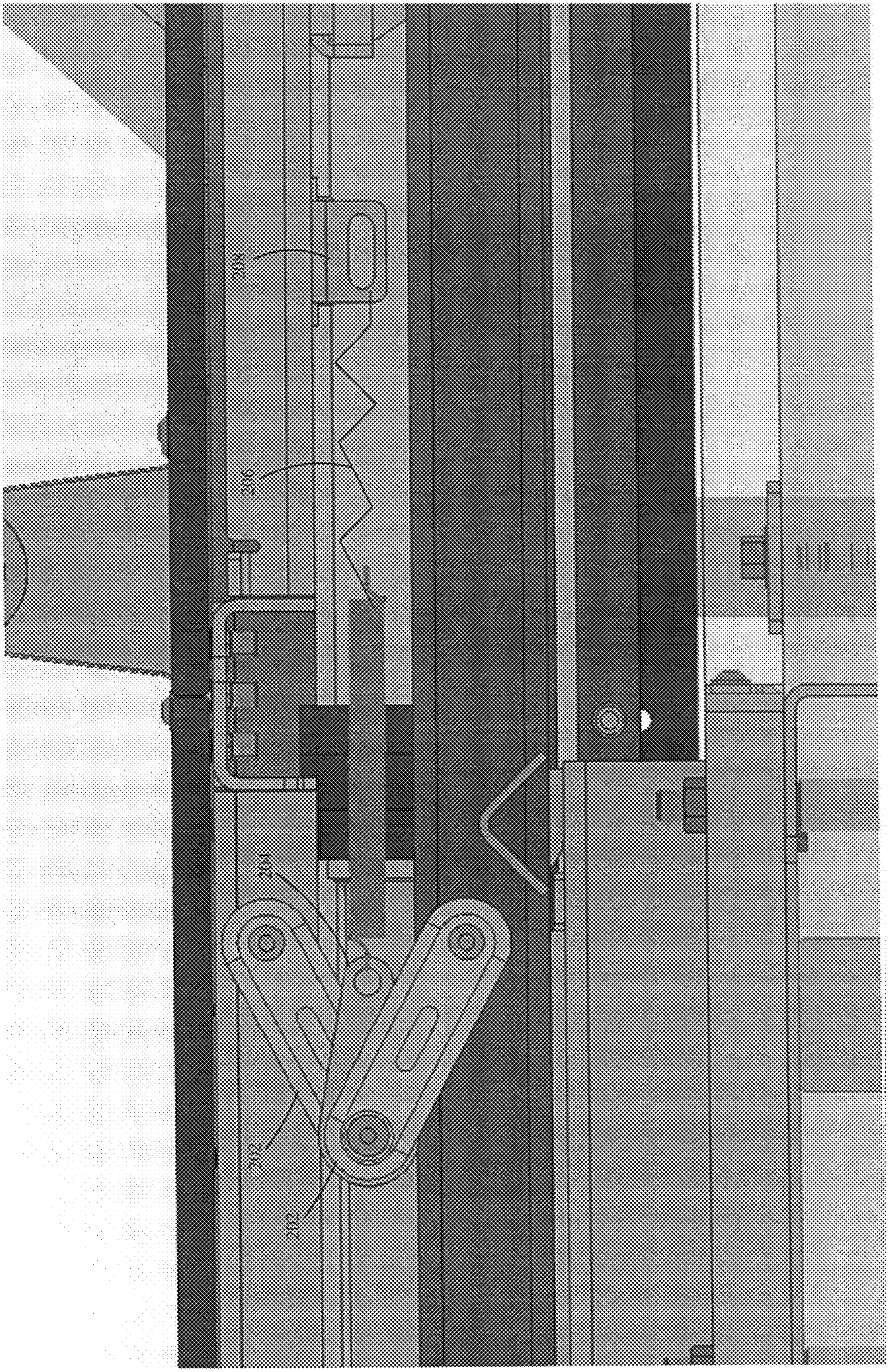
FIG. 29 is a side view showing an example acceleration assembly.

FIG. 29 is a side view showing an example acceleration assembly. As shown, spring 206 is coupled to coupler 208.

Figure 30:
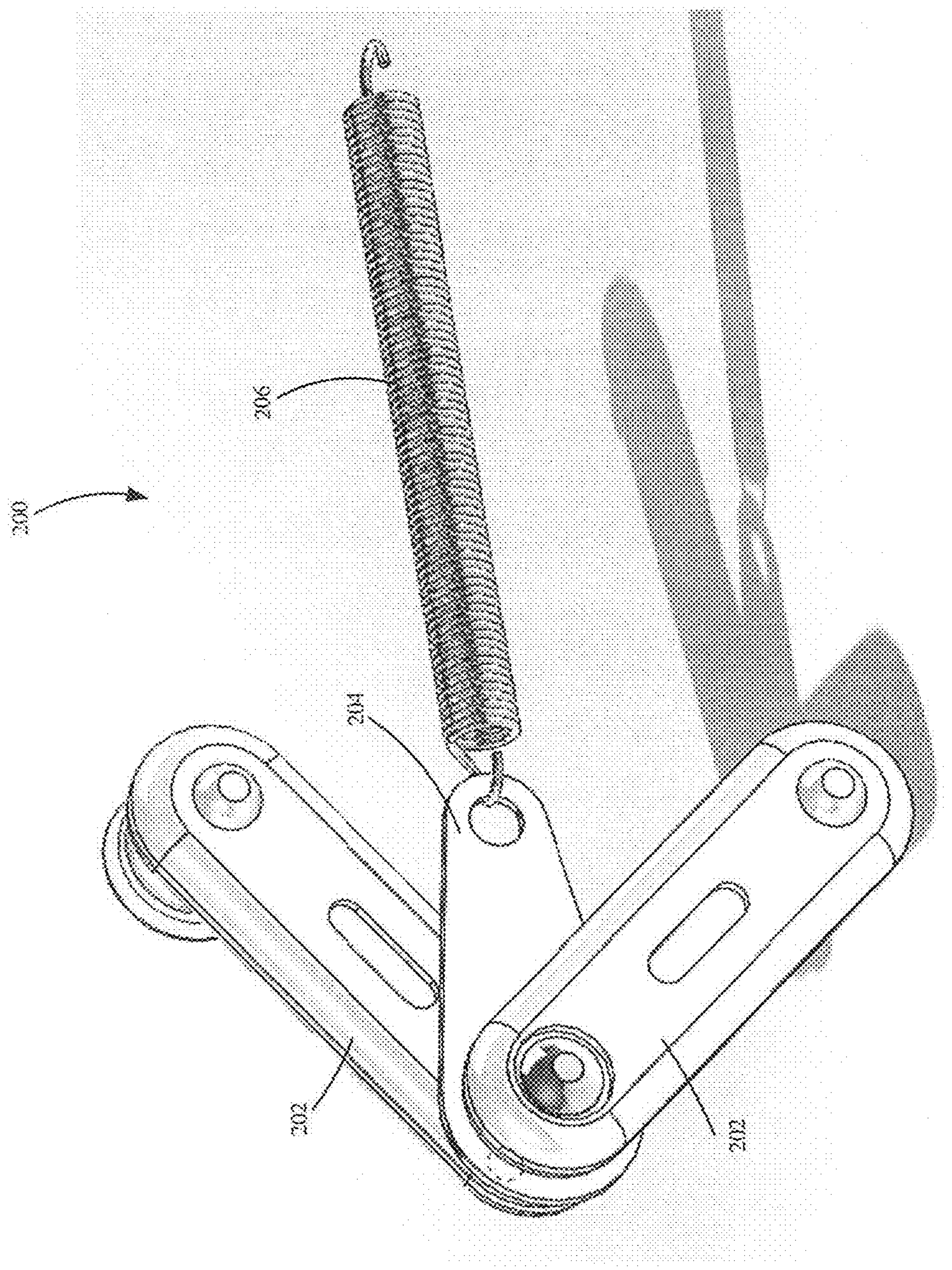
FIG. 30 is a perspective view showing an example linkage assembly.

FIG. 30 is a perspective component view showing an example acceleration assembly 200. The components of linkage assembly 200 can include metal and/or composite/plastic components. In some examples, the linkages couple to one another via a friction reducing bearing.

Figure 31:
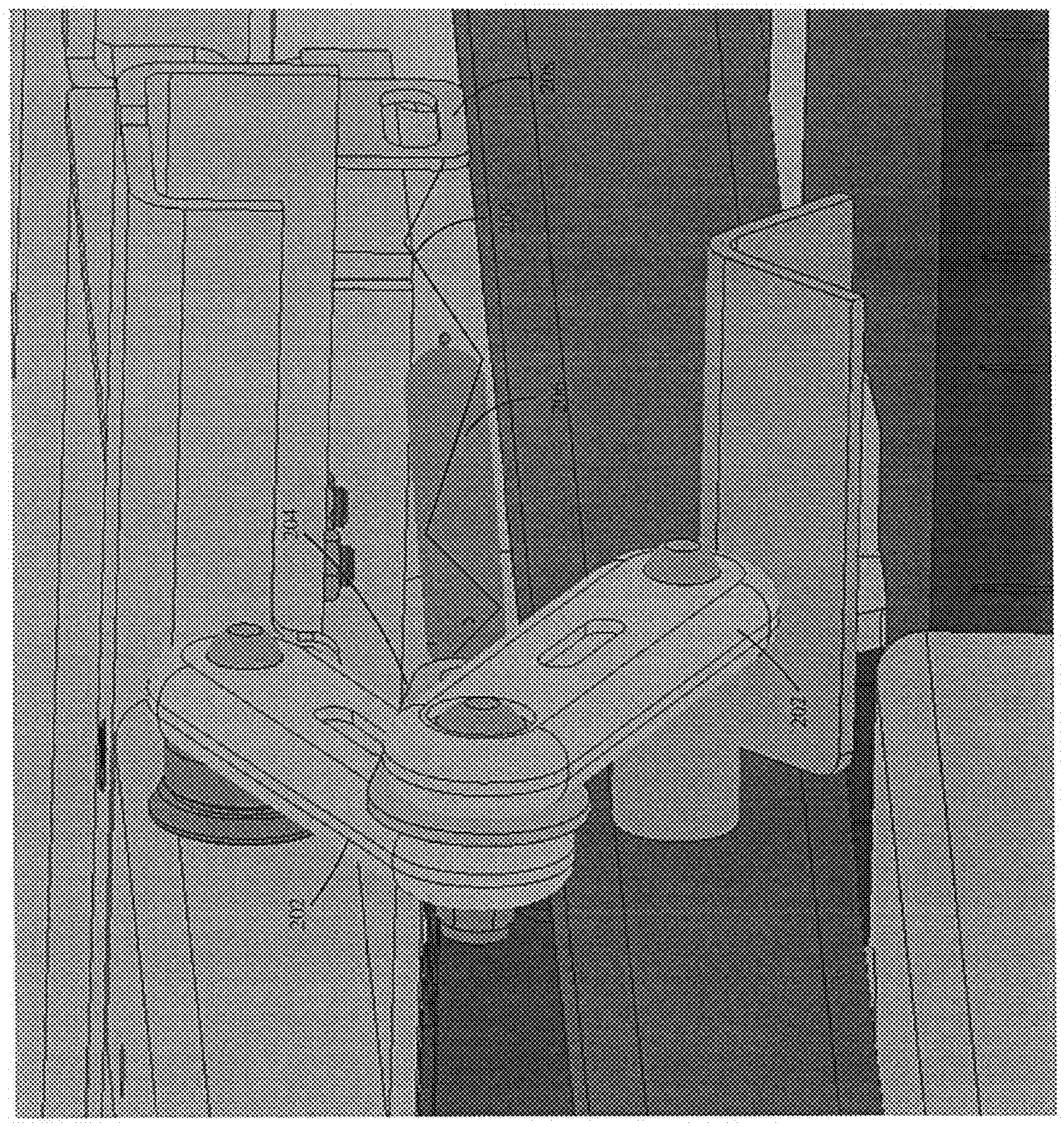
FIG. 31 is a perspective view showing an example acceleration assembly retracted.
Figure 32:
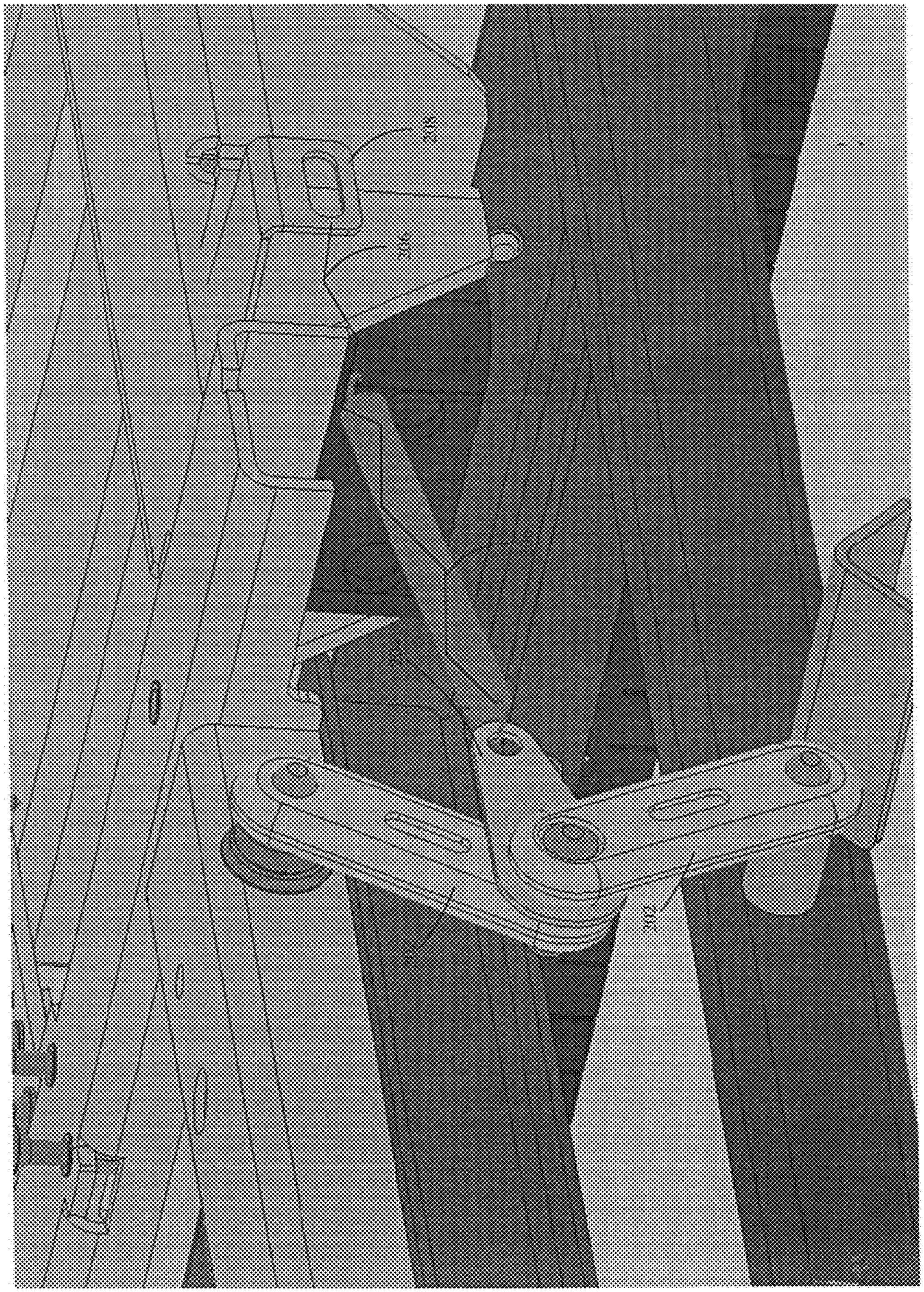
FIG. 32 is a perspective view showing an example acceleration assembly extended.

FIG. 31 is a perspective view showing an example acceleration assembly 200 retracted. In this position the linkages 202 are at an acute angle relative to one another. FIG. 32 is a perspective view showing an example acceleration assembly 200 extended. In this position the linkages 202 are at an obtuse angle relative to one another. The angles of the linkages cause springs 206 to enact different forces on platform 112. This way the force of opposing springs 206 do not cancel out one another.

In some of the previous figures, the shown spring 206 does not extend to coupler 208. This is a CAD graphical rendering error, the connection of spring 206 to coupler 208 is expressly contemplated.

Although the present invention has been described with reference to preferred embodiments, workers skilled in the art will recognize that changes may be made in form and detail without departing from the spirit and scope of the invention.

What is claimed is:

1. A playground device, comprising:

a platform;

an acceleration assembly operatively coupled to the platform, the acceleration assembly including:

a plurality of linkages pivotally connected to each other, and wherein at least one of the linkages is also pivotally connected to the platform;

a coupler attached to the platform; and a force storing component that forms at least part of a connection between the coupler and the plurality of linkages, wherein the force storing component stores potential energy when the platform is in a resting position and releases the stored potential energy to assist in initiating motion of the platform.

2. The playground device of claim 1, wherein the force storing component is a spring.

3. The playground device of claim 2, wherein the spring is an extension spring.

4. The playground device of claim 1, wherein the plurality of linkages is a first and second linkage, and wherein an angle between the first and second linkages is configured to change as the stored potential energy is released.

5. The playground device of claim 4, wherein the acceleration assembly is configured such that a change in angle between the first and second linkages is proportional to a change in the force storing component, such that a greater extension or compression of the force storing component results in a larger change in the angle between the first and second linkages.

6. A method of operating a playground device, the method comprising:

providing a platform;

providing an acceleration assembly that includes a plurality of linkages pivotally connected to each other, and wherein at least one of the linkages is also pivotally connected to the platform;

changing an angle between the first and second linkages as stored potential energy is released from a force storing component that is connected to the plurality of linkages, and wherein said change in the angle is proportional to a change in the force storing component.

7. The method of claim 6, wherein the force storing component is a spring.

8. The method of claim 7, wherein the spring is an extension spring.

9. The method of claim 6, wherein the change in the angle between the first and second linkages is initiated by a user applying a force to the platform.

10. The method of claim 6, wherein the platform is part of a swing, and the change in the angle between the first and second linkages initiates a swinging motion of the swing.

11. The method of claim 6, wherein the plurality of linkages includes a first linkage and a second linkage, and wherein the first linkage is pivotally connected to the platform.

12. The method of claim 11, wherein the second linkage is pivotally connected to a coupler, and wherein the coupler is attached to the platform.

13. The method of claim 6, wherein the force storing component is configured to store potential energy when the platform is in a resting position and to release the stored potential energy to assist in initiating motion of the platform when a user applies a force to the platform.

14. The method of claim 6, wherein the change in the angle between the first and second linkages is proportional to a change in the force storing component, such that a greater extension or compression of the force storing component results in a larger change in the angle between the first and second linkages.

15. An acceleration assembly for a playground device, comprising:

a plurality of linkages pivotally interconnected, wherein at least one of the linkages is also pivotally connected to a platform of the playground device;

a coupler attached to the platform of the playground device; and a force storing component forming at least part of a connection between the coupler and the plurality of linkages, wherein the force storing component is configured to store potential energy when the platform is in a resting position and to release the stored potential energy to assist in initiating motion of the platform.

16. The acceleration assembly of claim 15, wherein the force storing component is a spring.

17. The acceleration assembly of claim 16, wherein the spring is an extension spring.

18. The acceleration assembly of claim 15, wherein the plurality of linkages includes a first linkage and a second linkage, and wherein the first linkage is pivotally connected to the platform.

19. The acceleration assembly of claim 15, wherein the plurality of linkages includes a first linkage pivotally connected to a second linkage, and wherein the first second linkages each include at least one additional pivitol connection to another component.

20. The acceleration assembly of claim 15, wherein the force storing component is configured to store potential energy when the platform is in a resting position and to release the stored potential energy to assist in initiating motion of the platform when a user applies a force to the platform.

* * * * *